United States Patent [19]
Ikeda et al.

[11] Patent Number: 5,123,148
[45] Date of Patent: Jun. 23, 1992

[54] APPARATUS FOR FEEDING AND INSTALLING HINGE PINS FOR MOTOR VEHICLES DOORS

[75] Inventors: Yuzi Ikeda; Shigeo Kaibuki; Shinpei Watanabe; Hiroshi Moriya; Shunji Kobayashi; Mitsugu Takahashi; Shoichi Hayashi; Yukihiro Yaguchi, all of Sayama, Japan

[73] Assignee: Honda Giken Kogyo Kabushiki Kaisha, Tokyo, Japan

[21] Appl. No.: 585,011

[22] Filed: Sep. 19, 1990

[30] Foreign Application Priority Data

| Sep. 20, 1989 | [JP] | Japan | 1-244510 |
| Sep. 20, 1989 | [JP] | Japan | 1-244511 |
| Dec. 21, 1989 | [JP] | Japan | 1-333564 |
| Dec. 21, 1989 | [JP] | Japan | 1-333565 |

[51] Int. Cl.$^5$ ............... B21D 53/40; B23P 19/00
[52] U.S. Cl. ............... 29/11; 29/793; 29/799; 29/281.1; 29/430; 29/784
[58] Field of Search ............ 29/11, 791, 793, 799, 29/281.1, 429, 430, 469, 783, 784; 269/8; 227/113

[56] References Cited

U.S. PATENT DOCUMENTS

| 4,589,184 | 5/1986 | Asano et al. | 29/799 X |
| 4,863,149 | 9/1989 | Luther et al. | 269/8 |
| 4,884,330 | 12/1989 | Sticht | 29/784 X |
| 4,907,331 | 3/1990 | Kaibuki et al. | 29/252 X |

FOREIGN PATENT DOCUMENTS

| 2193931 | 2/1988 | United Kingdom . |
| 2231847 | 11/1990 | United Kingdom . |
| 2233611 | 1/1991 | United Kingdom . |

Primary Examiner—P. W. Echols
Assistant Examiner—S. Thomas Hughes

[57] ABSTRACT

A hinge pin couples a first hinge receiver mounted on a vehicle body and a second hinge receiver mounted on a door to be installed on the vehicle body. The hinge pin is removed from the vehicle body and the door to separate the vehicle body and the door from each other after the vehicle body and the door have been coated, and the removed pin engages in a hinge pin engaging member. The hinge pin is fed to a position where the vehicle body and the door are to be assembled together, and the hinge pin is removed from the hinge pin engaging member. Then, the removed hinge pin is pressed into the first and second hinge receivers which are aligned with each other, thereby coupling the vehicle body and the door to each other.

5 Claims, 22 Drawing Sheets

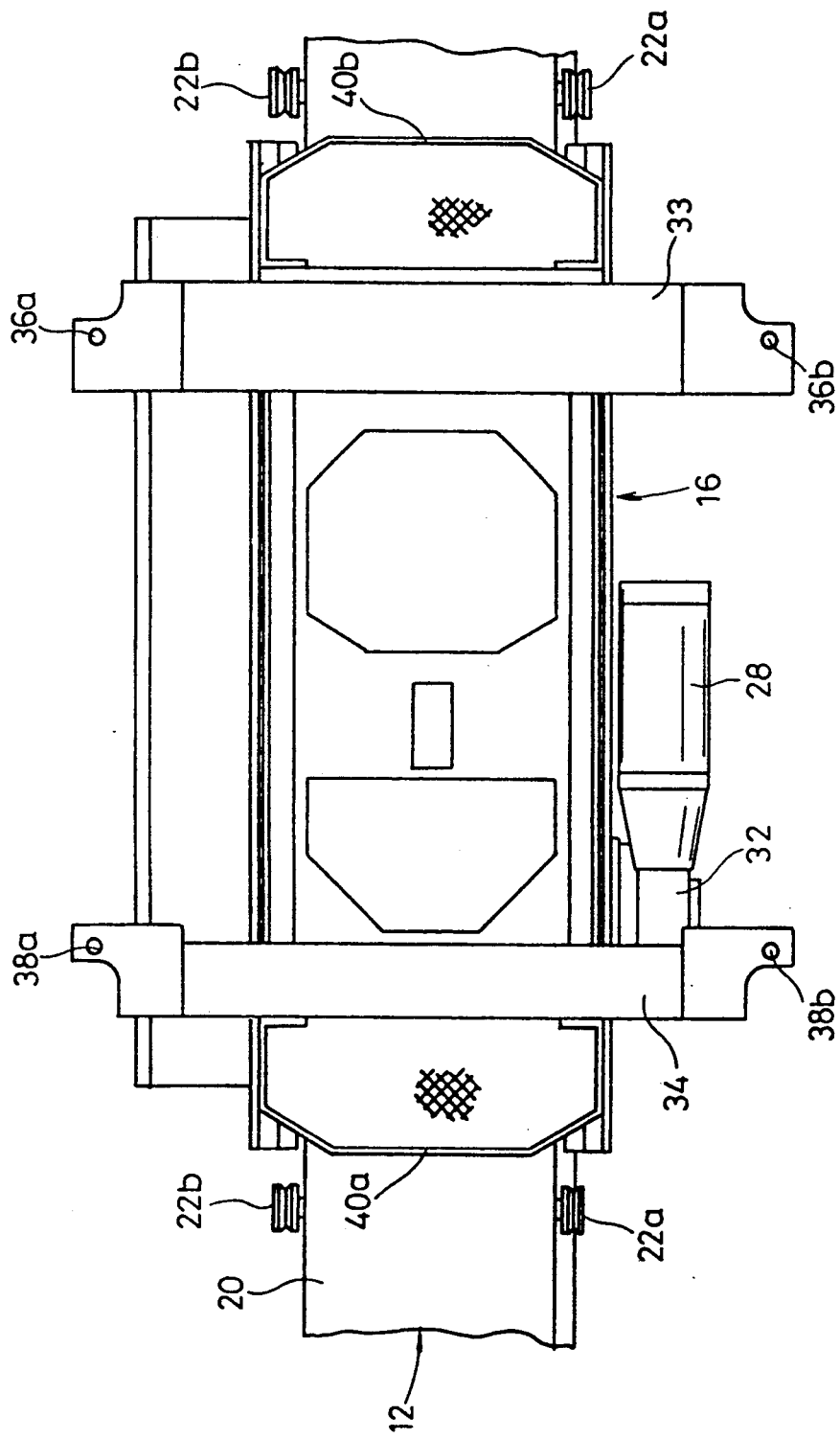

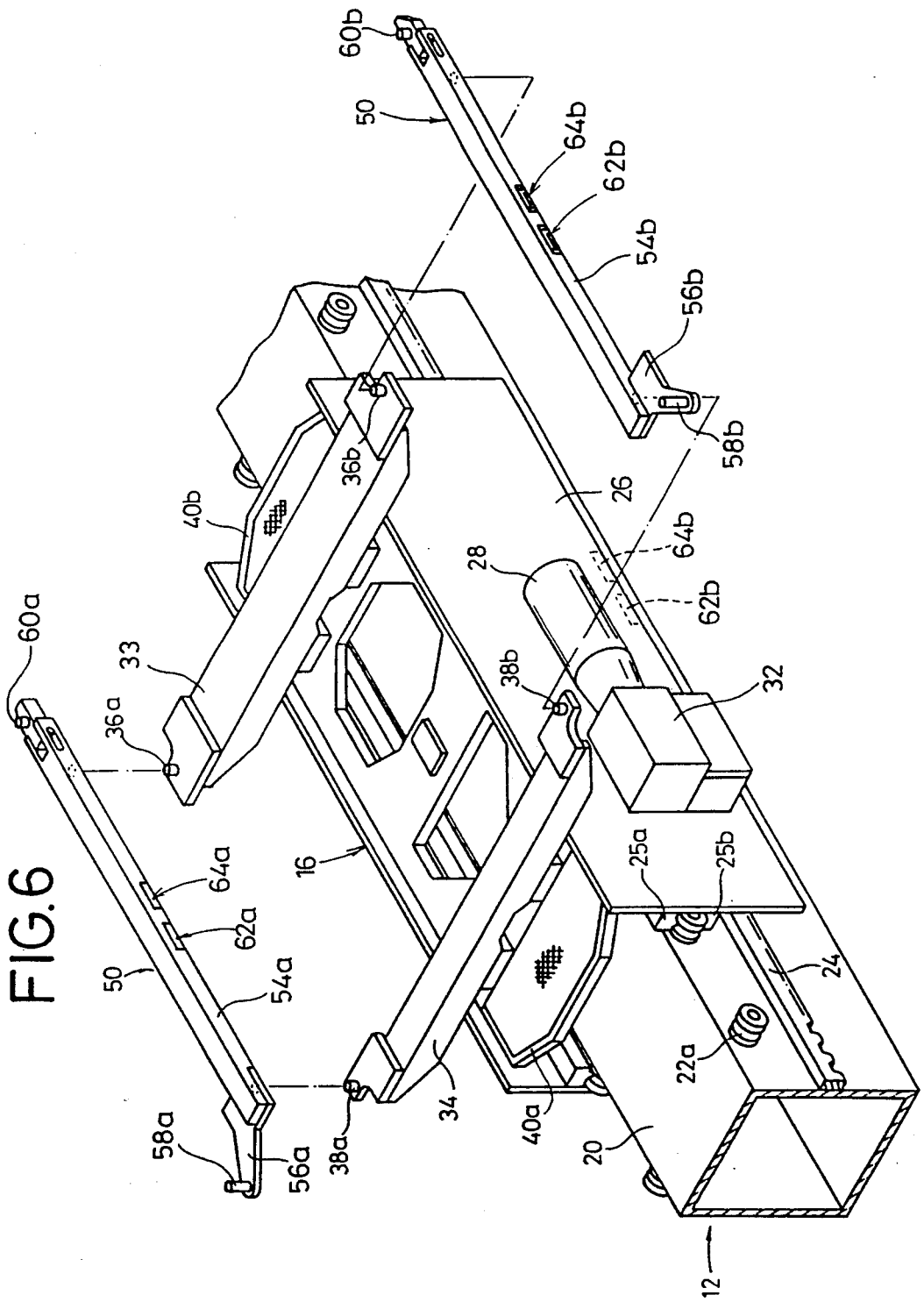

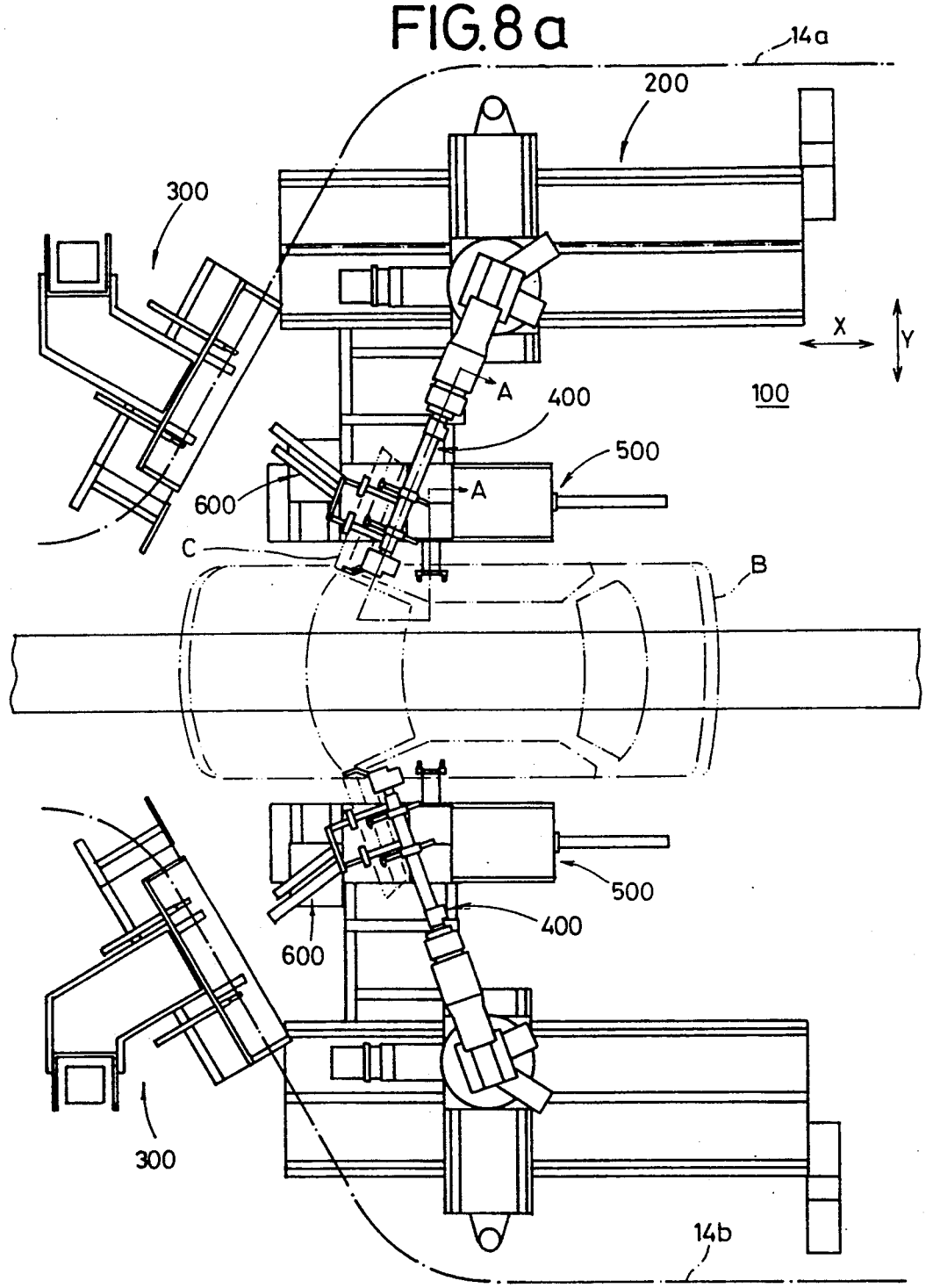

APPARATUS FOR FEEDING AND INSTALLING HINGE PINS FOR MOTOR VEHICLES DOORS

BACKGROUND OF THE INVENTION

1. Field of the Invention

The present invention relates to a method of and an apparatus for feeding and installing hinge pins by which a door will be coupled to an automobile body during the process of assembling automobiles.

2. Description of Background Art

Generally, automobiles are assembled in an assembling line by connecting doors to an automobile body with hinge pins, coating the doors and the automobile body together so that they have a uniform coating layer without any undesired coating irregularities, then separating the doors from the automobile, trimming the doors and the automobile body separately, and thereafter putting the doors and the automobile body together. When the doors are to be mounted on the automobile body, hinge members are attached in advance to the doors and automobile body, and hinge pins are inserted into hinge member pairs, thus combining the doors with the automobile body.

After the doors and the automobile body have been coated in the coating process, the doors are temporarily detached from the automobile body, as described above, because large parts such as seats should be brought into the automobile body through large openings defined with the doors removed. To assemble the doors and the automobile body together thereafter, the hinge pins which have been detached once should preferably be fed along the assembling line and used again on the doors and the automobile body. If different hinge pins are used before and after the coating process, then it would be tedious to keep the hinge pins neatly organized and stored for ready use, and the number of hinge pins to be used would be doubled. In the coating process, the hinge pins mounted on the doors and the automobile body are coated in the same color as the doors and the automobile body which are coated. The coated hinge pins which are used again after the coating process are aesthetically advantageous because of the color match between the hinge pins and the doors and the automobile body.

When the hinge pins are to be fed along the assembling line, they may be placed on the floor of the automobile body. However, the hinge pins which are simply placed on the floor of the automobile body and fed to a final assembling process may present an obstacle to the installation of various fittings or trims in the automobile body. Therefore, the automobile body itself does not have sufficient space for placing the hinge pins thereon. Depending on the position where the hinge pins are placed, they may obstruct various components such as a floor carpet, an instrument panel, etc. as they are successively installed in the automobile body.

SUMMARY OF THE INVENTION

It is a general object of the present invention to provide a method of and an apparatus for feeding and installing hinge pins for motor vehicle doors, with the hinge pins being simply and reliably kept neatly in readiness for coupling the doors to motor vehicle bodies.

It is a major object of the present invention to provide a method of and an apparatus for feeding and installing hinge pins for motor vehicle doors, while holding the hinge pins out of interference with the installation of various components in motor vehicle bodies.

Another object of the present invention is to provide a method of and an apparatus for feeding and installing hinge pins for motor vehicle bodies, by holding hinge pins with a hinge pin holding means which moves with a motor vehicle body along a motor vehicle assembling line, removing the hinge pins from the hinge pin holding means, and coupling doors to a motor vehicle body with the removed hinge pins.

Still another object of the present invention is to provide a method of and an apparatus for feeding and installing hinge pins for motor vehicle doors in a motor vehicle assembling line, with a hinge pin holding means mounted on a pallet for conveying a motor vehicle body or a carriage for supporting the pallet, by removing hinge pins from the hinge pin holding means on the pallet or the carriage, provisionally attaching doors to a motor vehicle body placed on the carriage, and thereafter coupling the doors to the motor vehicle body with the removed hinge pins.

Yet another object of the present invention is to provide a method of and an apparatus for feeding and installing hinge pins for motor vehicle doors, by provisionally placing hinge pins on hinge receivers on doors or a motor vehicle body which moves along a motor vehicle assembling line, removing the hinge pins from the hinge receivers, provisionally attaching the doors to the motor vehicle body, and coupling the doors to the motor vehicle body with the removed hinge pins.

A further object of the present invention is to provide a method of feeding and installing a hinge pin for coupling a first hinge member mounted on a vehicle body and a second hinge member mounted on a door to be installed on the vehicle body, the method comprising the steps of removing a hinge pin from the vehicle body and the door to separate the vehicle body and the door from each other after the vehicle body and the door have been coated, engaging the removed hinge pin in a hinge pin engaging member, feeding the hinge pin to a position where the vehicle body and the door are to be assembled together, removing the hinge pin from the hinge pin engaging member, and pressing the removed hinge pin into the first and second hinge members which are aligned with each other, thereby coupling the vehicle body and the door to each other.

A still further object of the present invention is to provide the method wherein the hinge pin is fed while being engaged in the hinge pin engaging member which is disposed on a vehicle body conveying means.

A yet further object of the present invention is to provide the method wherein the vehicle body conveying means comprises a pallet for placing the vehicle body thereon or a carriage for supporting the pallet.

A yet still further object of the present invention is to provide the method wherein the pin is fed while being engaged by the second hinge member on the door.

Another object of the present invention is to provide the method wherein the hinge pin is fed while being inserted in the first hinge member on the vehicle body.

Still another object of the present invention is to provide the method wherein the hinge pin removed from the vehicle body and the door is held and fed in advance by a previous vehicle body conveying means.

Yet another object of the present invention is to provide the method further including the step of holding the hinge pin in a predetermined posture under magnetic attractive forces from a magnet in the hinge pin engaging member while the hinge pin is being fed to the position.

Yet still another object of the present invention is to provide the method wherein the magnet in the hinge pin engaging member is magnetically shielded circumferentially except for at least a portion held against the hinge pin.

Yet another object of the present invention is to provide the method further including the step of inverting the hinge pin before the hinge pin is pressed into the first and second hinge members, thereby coupling the vehicle body and the door to each other.

Yet still another object of the present invention is to provide the method further including the steps of receiving the hinge pin engaged in and fed by the hinge pin engaging member, with a pressing arm of a hinge pin pressing mechanism, and, after the first and second hinge members are aligned with each other, pressing the hinge pin into the first and second hinge members with the hinge pin pressing mechanism.

It is also an object of the present invention to provide an apparatus for feeding and installing a hinge pin for coupling a first hinge member mounted on a vehicle body and a second hinge member mounted on a door to be installed on the vehicle body, the apparatus comprising a vehicle body conveying line for conveying a vehicle body, a door conveying line for conveying a door, a door installing mechanism for installing the door on the vehicle body which is conveyed by the door conveying line, hinge pin feeding means for feeding a hinge pin, the hinge pin feeding means comprising a hinge pin engaging member for engaging the hinge pin, the hinge pin engaging member being displaceable in unison with the vehicle body conveyed by the vehicle body conveying line, and hinge pin installing means for installing the hinge pin on the vehicle body and the door, the hinge pin installing means comprising a hinge pin pressing mechanism for pressing the hinge pin into the first and second hinge members.

Another object of the present invention is to provide the apparatus wherein the hinge pin feeding means comprises one of the first and second hinge members on the vehicle body and the door which are separated from each other.

Still another object of the present invention is to provide the apparatus wherein the vehicle body conveying line includes vehicle body conveying means, the hinge pin engaging member being mounted on the vehicle body conveying means.

Yet another object of the present invention is to provide the apparatus wherein the vehicle body conveying means comprises a pallet for placing the vehicle body thereon.

Yet still another object of the present invention is to provide the apparatus wherein the vehicle body conveying means comprises a carriage for supporting the pallet.

A further object of the present invention is to provide the apparatus wherein the hinge pin engaging member has a first opening which opens outwardly for receiving a shank of the hinge pin, and a second opening held in communication with the first opening, for receiving a head of the hinge pin.

A still further object of the present invention is to provide the apparatus wherein the hinge pin engaging member includes a permanent magnet facing into the second opening and a magnetic shield sleeve by which the permanent magnet is partly magnetically shielded.

A yet still further object of the present invention is to provide the apparatus wherein the hinge pin engaging member is constructed to hold two hinge pins at a time.

A still further object of the present invention is to provide the apparatus wherein the hinge pin installing means comprises a load bearing arm for engaging the first hinge member, a hinge pin pressing arm movable through the second hinge member toward the first hinge member, and an actuator for moving the hinge pin pressing arm, the hinge pin pressing arm having a permanent magnet for holding the hinge pin.

Another object of the present invention is to provide the apparatus wherein the load bearing arm has a curved or tapered distal end.

Still another object of the present invention is to provide the apparatus further comprising a table unit disposed alongside of the vehicle body conveying line and movable between the vehicle body conveying means and the door installing mechanism, the table unit having a vertically movable table, a rotary actuator unit disposed on a base on the vertically movable table, a table rotatable by the rotary actuator unit, a clamp displaceable along a rail on the table, and an actuator for opening and closing the clamp to release and grip the hinge pin.

Yet another object of the present invention is to provide the apparatus wherein the rotary actuator unit comprises first and second rotary actuators for rotating brackets fixed to rotatable shafts thereof perpendicularly to each other.

Yet still another object of the present invention is to provide the apparatus wherein the clamp is displaceable away from each other along the rail by the actuators for gripping the hinge pin.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a plan view of the carriage shown in FIG. 4;

FIG. 6 is a perspective view of the pallet;

DETAILED DESCRIPTION OF THE PREFERRED EMBODIMENTS

Figure 1:
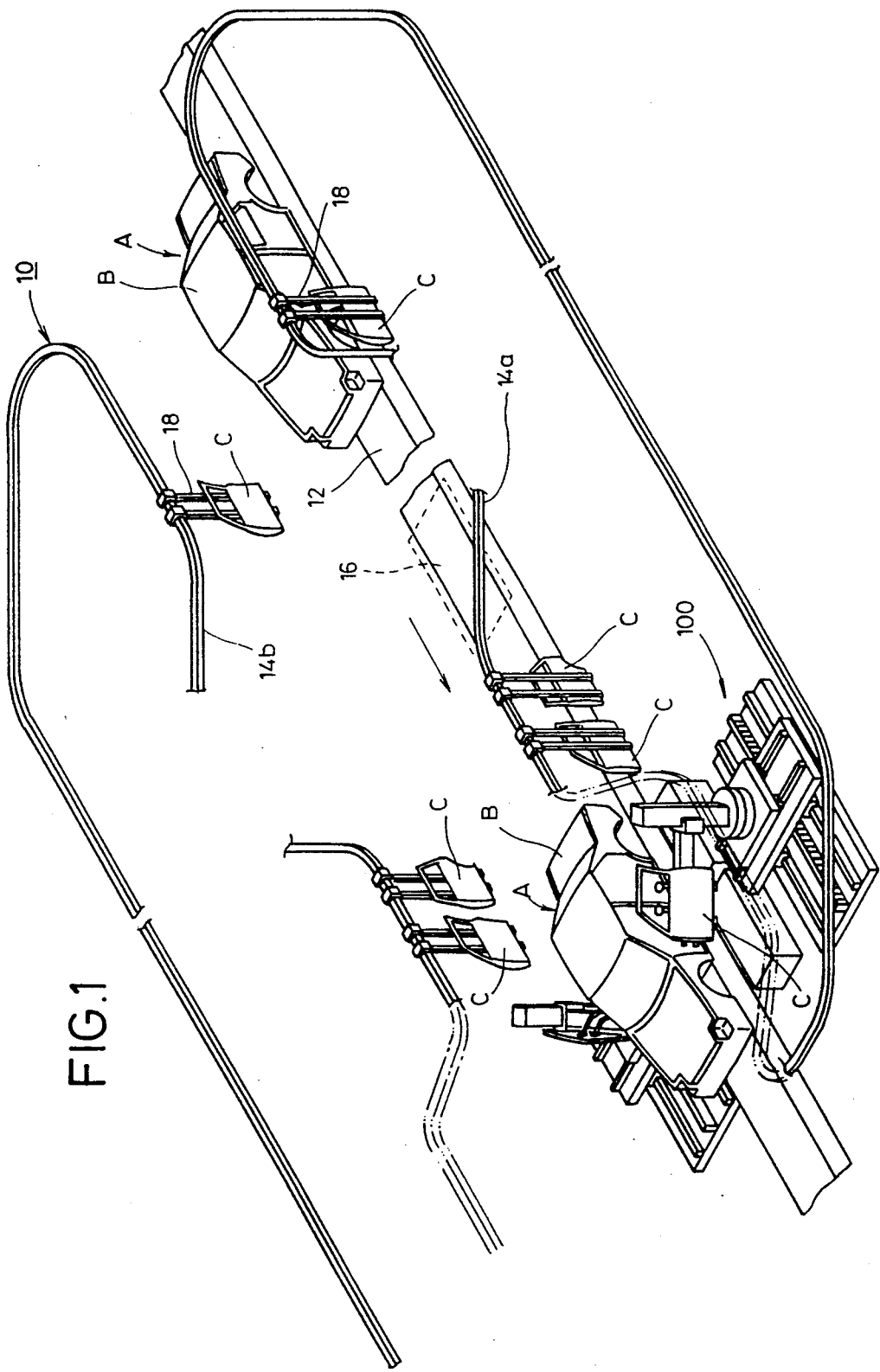
FIG. 1 is a schematic perspective view of an entire system for carrying out a method of feeding and installing hinge pins according to the present invention.

FIG. 1 schematically shows an assembling line for manufacturing motor vehicles such as automobiles. The assembling line, generally denoted at 10, basically includes a carriage rail 12 and a pair of door conveying rails 14a, 14b positioned above the carriage rail 12. A motor vehicle A basically includes a vehicle body B and doors C. The vehicle body B is conveyed by a self-propelled carriage 16 movably disposed on the carriage rail 12, whereas the doors C are suspended and conveyed by hanger means 18 which are displaceable along the door conveying rails 14a, 14b.

Figure 2:
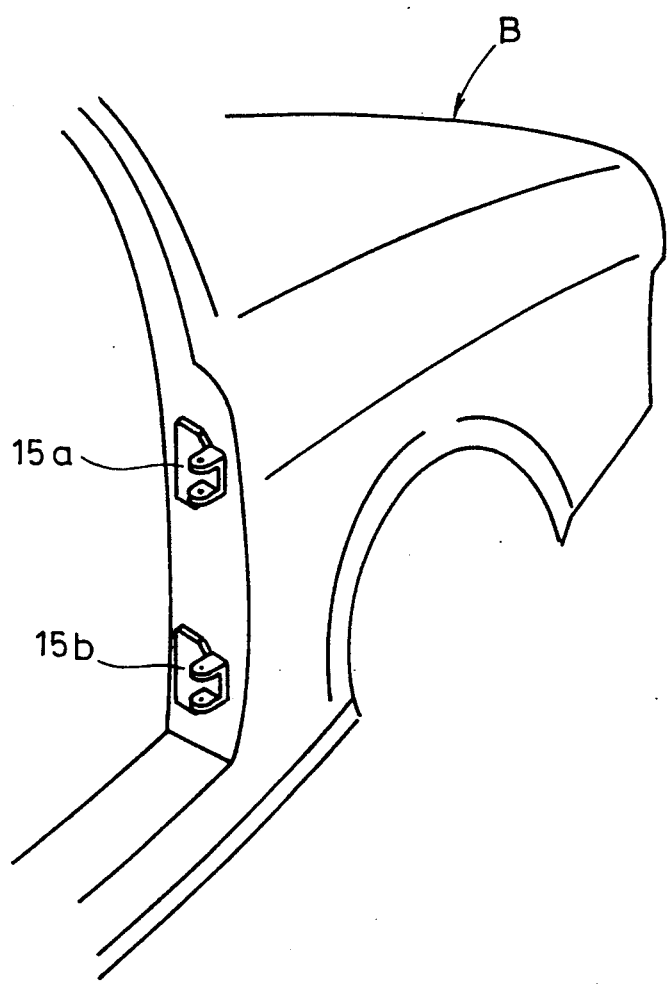
FIG. 2 is a fragmentary perspective view of a motor vehicle body with hinge receivers.
Figure 3:
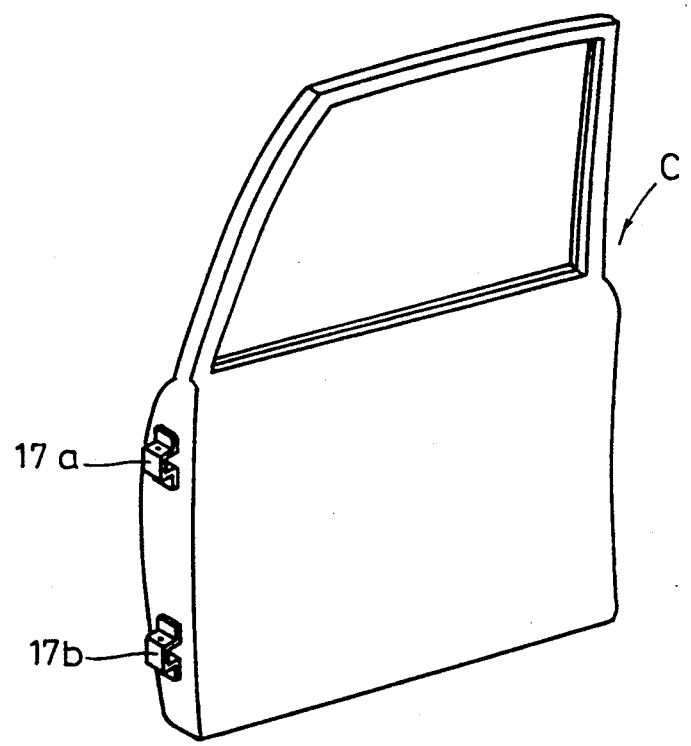
FIG. 3 is a perspective view of a motor vehicle door with hinge receivers.

The vehicle body B has in one opening thereof a pair of first upper and lower hinge receivers 15a, 15b (FIG. 2) by which each door C can be openably and closably pivoted to the vehicle body B. Each door C also has on an edge thereof a pair of second upper and lower hinge receivers 17a, 17b (FIG. 3) by which the door C can openably and closably be hinged to the vehicle body B. With the first hinge receivers 15a, 15b and the second hinge receivers 17a, 17b pivotally coupled to each other by hinge pins, the vehicle body B and the doors C which are coupled thereto are coated with a paint. Thereafter, the hinge pins are removed to separate the vehicle body B and the doors C from each other, and the vehicle body B and the doors C are fed along so that they are trimmed.

Figure 4:
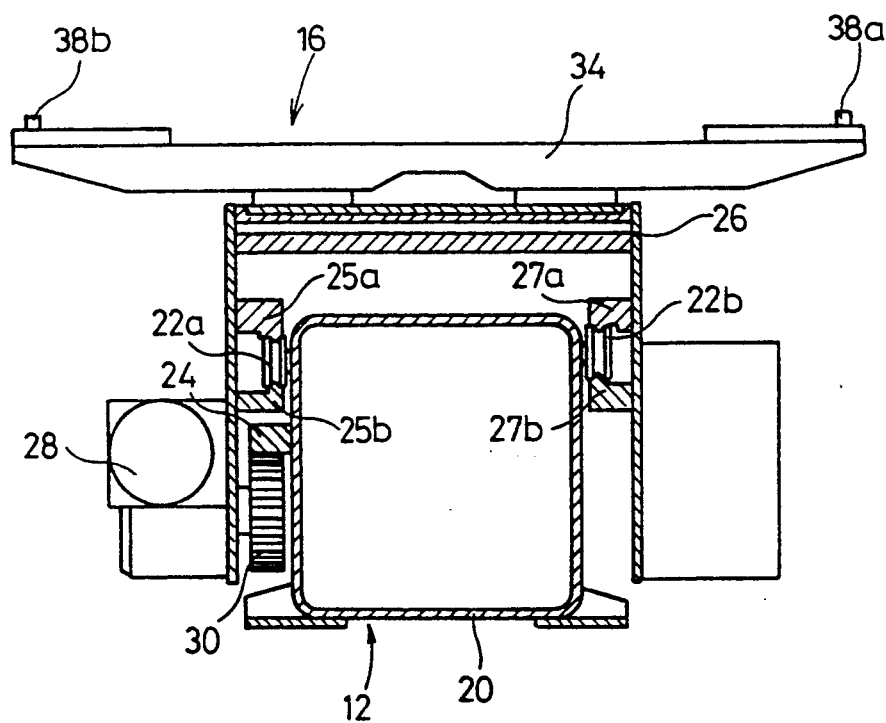
FIG. 4 is a vertical cross-sectional view of a motor vehicle conveying carriage which is displaced in unison with a pallet which holds hinge pins.

FIGS. 4 and 5 show the carriage 16 which is self-propelled on the carriage rail 12. As shown in FIG. 4, the carriage rail 12 has a long hollow rail body 20 having a square-shaped cross section with two arrays of rollers 22a, 22b rotatably supported on upper sides of the rail body 20. A rack 24 is attached to and extends longitudinally along one side of the rail body 20. The carriage 16 has a casing 26 which surrounds the rail body 20 and which supports on inner confronting surfaces two pairs of rails 25a, 25b and 27a, 27b that sandwich and are held in rolling engagement with the rollers 22a, 22b. A motor 28, which serves as a self-propelling rotative drive source, is fixed to one outer side of the casing 26. The motor 28 has a rotatable drive shaft coupled to a worm speed reducer 32 (FIG. 5). Rotative power from the motor 28 is reduced in speed by the worm speed reducer 32 and then transmitted to a pinion 30 which is held in mesh with the rack 24. Therefore, when the motor 28 is energized, the pinion 30 is rotated in mesh with the rack 24, thereby moving the casing 26 in a desired direction along the rails 25a, 25b and 27a, 27b.

A pair of parallel spaced arms 33, 34 is fixed to an upper surface of the casing 26. Pins 36a, 36b are mounted on the respective opposite ends of the arm 33, the pins 36a, 36b projecting upwardly. Likewise, upwardly projecting pins 38a, 38b are mounted on the respective opposite ends of the arm 34. Bumpers 40a, 40b are attached to front and rear ends of the casing 26.

A pallet 50 (FIG. 6) is mounted on the arms 33, 34. Pallets 50 of different sizes may selectively be mounted on the pallet 50 so that motor vehicles of varying sizes can be conveyed by the carriage 16, and hence motor vehicles of different types can be manufactured in small quantities. The pallet 50 is detachably mounted on the pallet 50 using the pins 36a, 36b and 38a, 38b.

As shown in FIG. 6, the pallet 50 comprises a pair of support bars 54a, 54b fitted over the pins 36a, 36b and 38a, 38b perpendicularly to the arms 33, 34 and extending parallel to each other. The support bars 54a, 54b have on ends thereof respective bent members 56a, 56b which are inclined outwardly away from each other and support respective engagement pins 58a, 58b positioned on distal ends thereof and extending vertically upwardly. Similar engagement pins 60a, 60b are also disposed on the other ends of the respective support bars 54a, 54b.

Hinge pin engaging members 62a, 62b for front doors and hinge pin engaging members 64a, 64b are fixed to substantially central portions of the support bars 54a, 54b, respectively, by bolts or the like. These hinge pin engaging members 62a, 62b, 64a, 64b may be fixed to the casing 26 of the carriage 16, as indicated by the broken lines in FIG. 6. Since the hinge pin engaging members 62a, 62a, 64a, 64b are identical to each other, only the hinge pin engaging member 62a will be described in detail below.

Figure 7A:
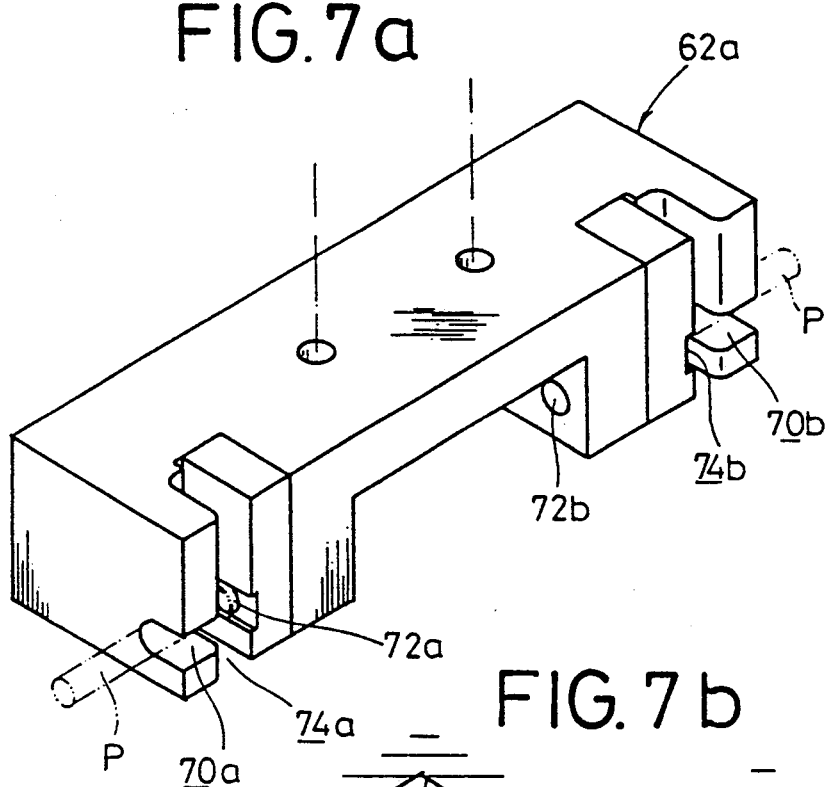
FIG. 7(a) is a perspective view of a hinge pin engagement member.
Figure 7B:
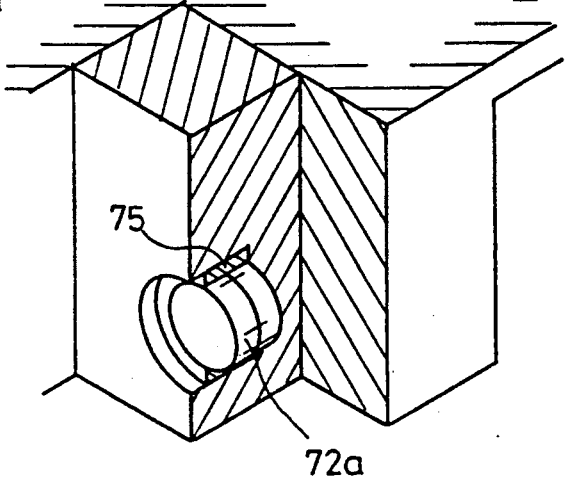
FIG. 7(b) is an enlarged fragmentary perspective view, partly cut away, of a magnetic shield sleeve and a permanent magnet of the hinge pin engagement member shown in FIG. 7(a)

As shown in FIG. 7(a), the hinge pin engaging member 62a comprises a bock substantially in the form of a rectangular parallelepiped and has a large opening in one side and two U-shaped grooves 70a, 70b defined in opposite ends thereof in the transverse direction. The U-shaped grooves 70a, 70b serve to receive shanks of hinge pins P. The U-shaped grooves 70a, 70b are held in communication with respective grooves 74a, 74b defined adjacent thereto in the hinge pin engaging member 62a, the grooves 74a, 74b serving to receive respective enlarged heads of hinge pins P. As shown in FIG. 7(b), permanent magnets 72a, 72b housed in cylindrical magnetic shield sleeves 75 are disposed in the hinge pin engaging member 62a so that the permanent magnets 72a, 72b face into the grooves 74a, 74b. The cylindrical magnetic shield sleeves 75 are effective to intensify the magnetic attractive forces which are applied to the hinge pins P by the permanent magnets 72a, 72b.

Instead of mounting the engagement pins 60a, 60b directly on the support bars 54a, 54b, the engagement pins 60a, 60b (FIG. 6) may be mounted on additional members which are extensible and contractable with respect to the support bars 54a, 54b so that the pallet 50 can be adjusted to vehicles bodies B of different lengths.

Figure 8B:
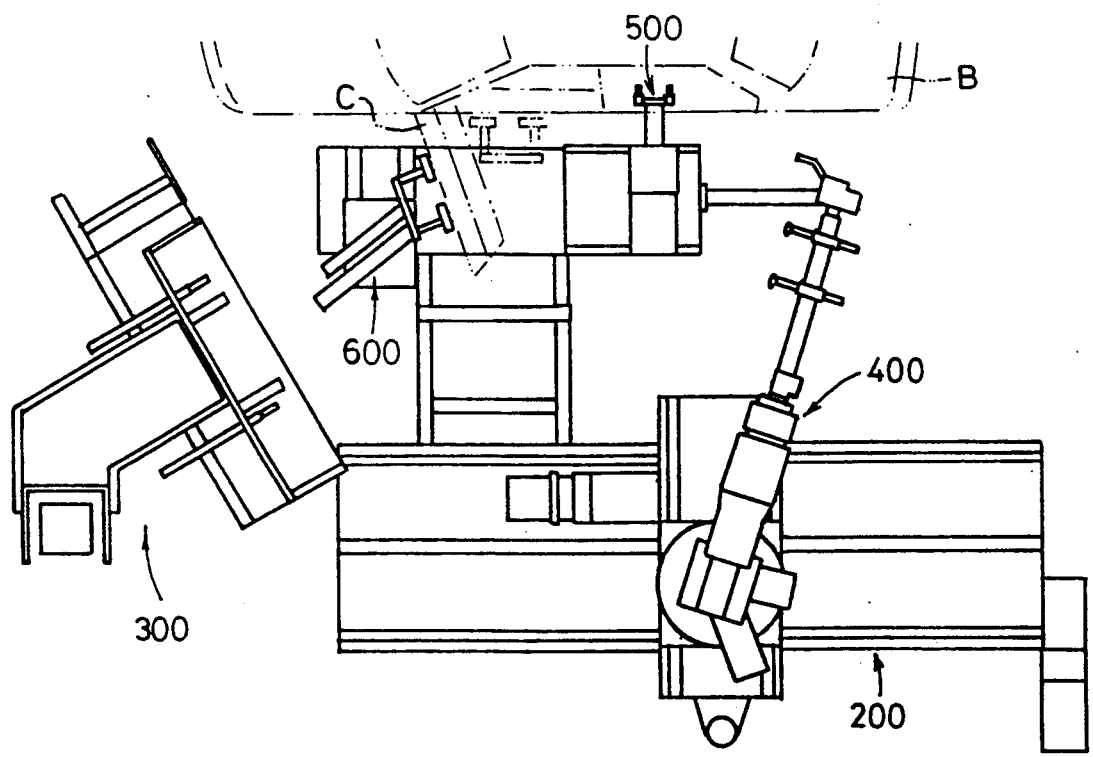
FIGS. 8(a) through 8(c) are pan views showing a mode of operation of a door installing station.
Figure 8:
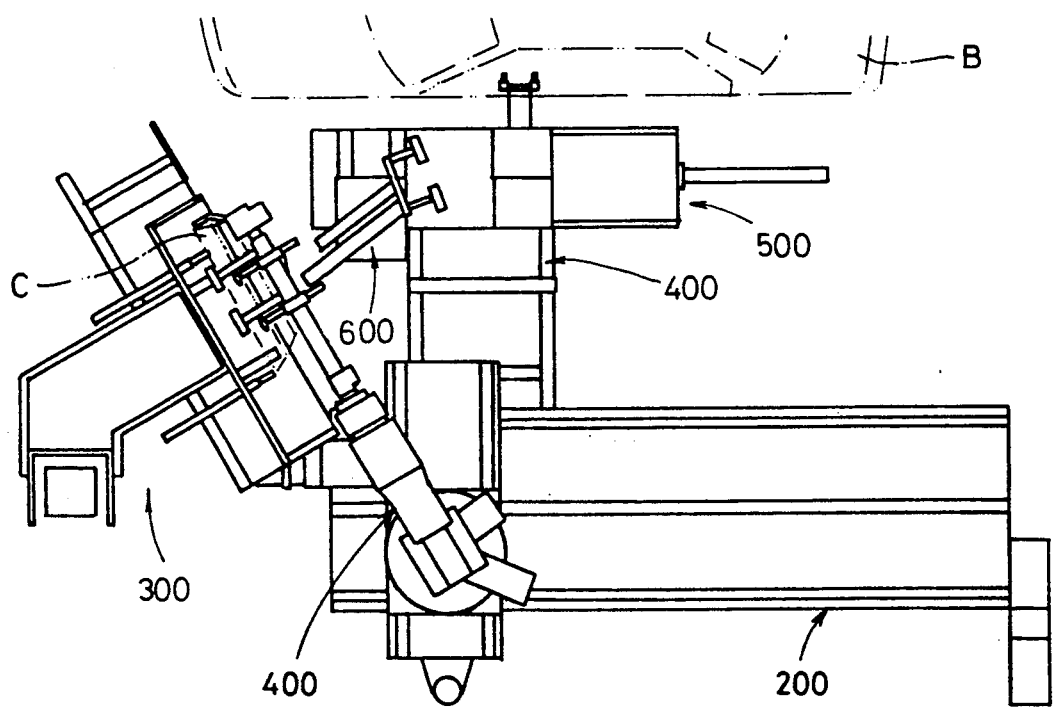

A door installing station 100 will now be described with reference to FIGS. 8(a) through 8(c).

The door installation station 100 essentially comprises a pair of door installing mechanisms 200, a pair of door presetting mechanisms 300, a pair of door installing robots 400, a pair of hinge pin setting mechanisms 500, and a pair of door closing mechanisms 600. The door installing mechanisms 200, the door presetting mechanisms 300, the door installing robots 400, the hinge pin setting mechanisms 500, and the door closing mechanisms 600 are disposed one on each side of the carriage rail 12, and basically of the same construction in each pair. Therefore, only one of the mechanisms and robots in each pair will be described in detail below.

The door presetting mechanism 300 is disposed below each of the door conveying rails 14a, 14b. A door C which is suspended and conveyed by the hanger means 18 along the door conveying rails 14a, 14b is first received and positioned by the door presetting mechanism 300. The door installing mechanism 200 can displace the door installing robot 400 in the transverse and longitudinal directions of vehicle bodies. The door installing robot 400 can be moved toward the door presetting mechanism 300 for the reception of the door C which is held by the door presetting mechanism 300. The door C which is received by the door installing robot 400 is then moved to a predetermined position with respect to the vehicle body B by the door installing robot 400 that is actuated by the door installing mechanism 200.

Figure 9:
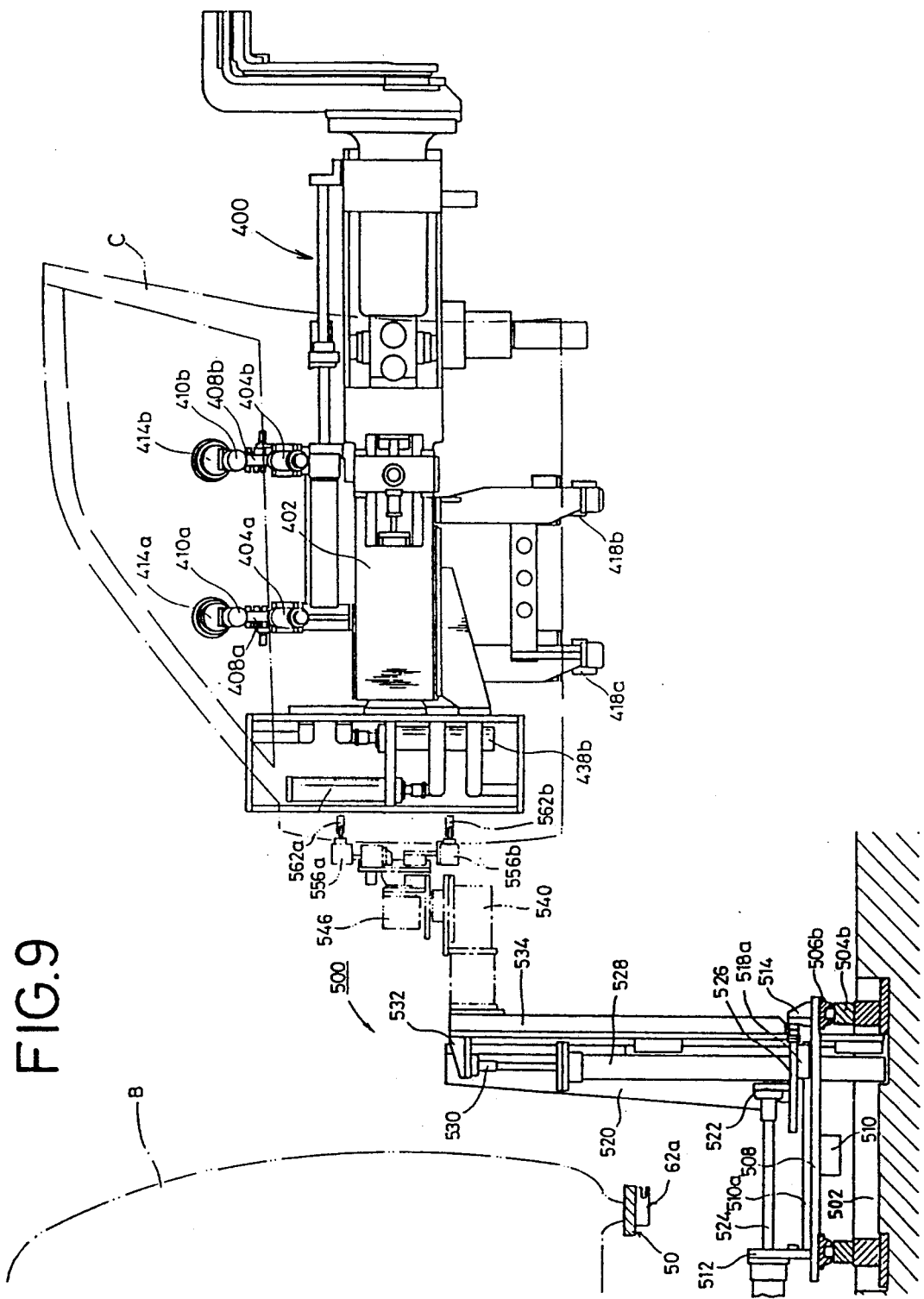
FIG. 9 is a side elevational view of the door installing station.
Figure 10:
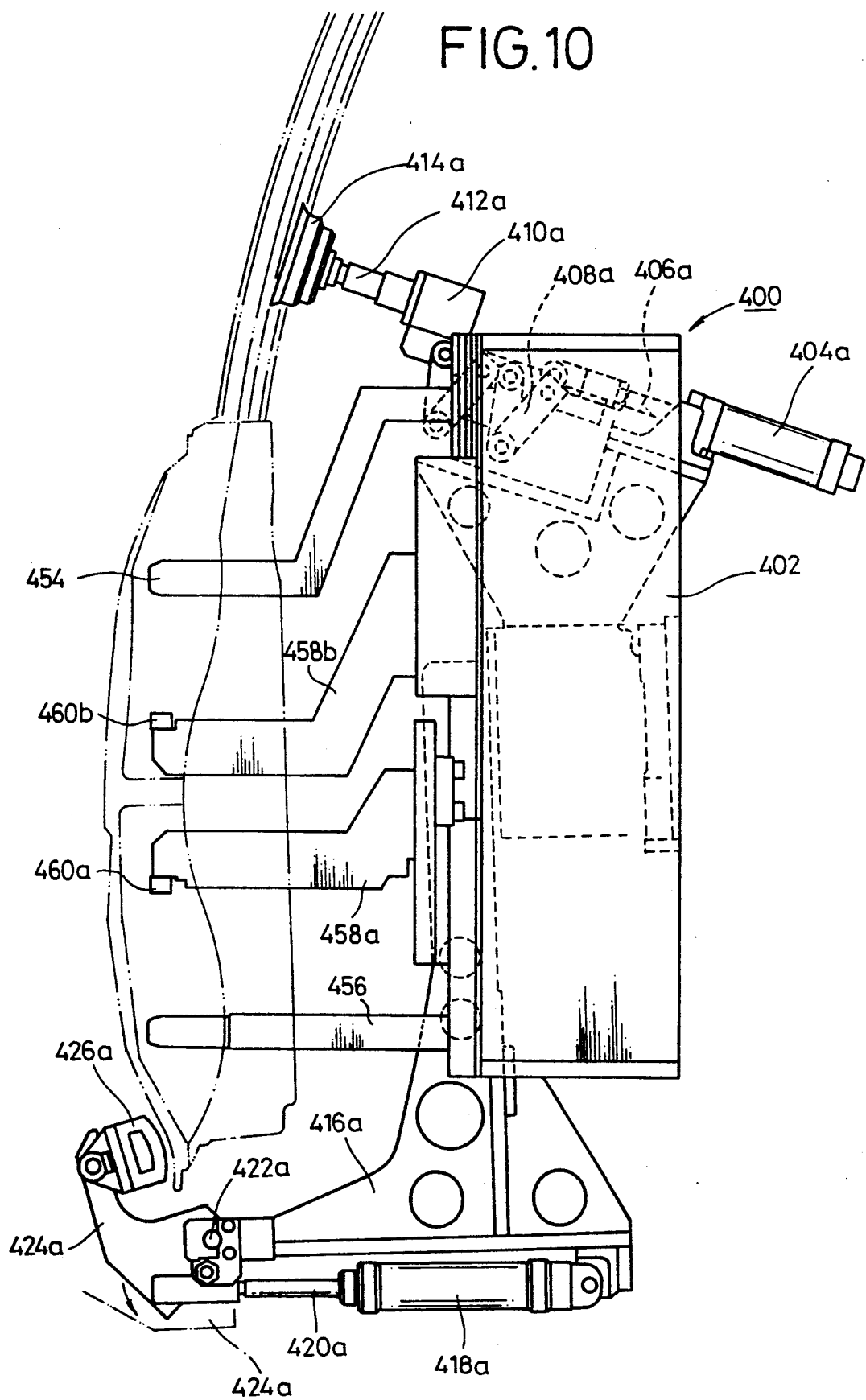
FIG. 10 is a vertical cross-sectional view of a door installing robot in the door installing station shown in FIG. 9.

As shown in FIGS. 9 and 10, the door installing robot 400 comprises a robot arm 402 with a first cylinder 404a mounted on an upper surface thereof. The first cylinder 404a has a piston rod 406a to which a second cylinder 410a is swingably coupled by a link mechanism 408a. The second cylinder 410a has a piston rod 412a whose distal end supports a suction cup or pad 414a which is connected to a vacuum source (not shown) for holding a door under suction.

As better shown in FIG. 10, a third cylinder 418a is mounted on a bracket 416a which extends downwardly from a lower surface of the arm 402. The third cylinder 418a has a piston rod 420a coupled to an angularly movable member 424a which is pivotally supported on the bracket 416a by a shaft 422a. A door holder 426a made of a urethane resin and having an arcuate curved surface is angularly movably mounted on the distal end of the angularly movable member 424a. As shown in FIG. 9, another set of components which are identical to the above-mentioned set of first, second, and third cylinders 404a, 410a, 418a and associated parts is disposed on the righthand side thereof, and these additional components are designated by the same reference numerals with a suffix b.

Figure 11:
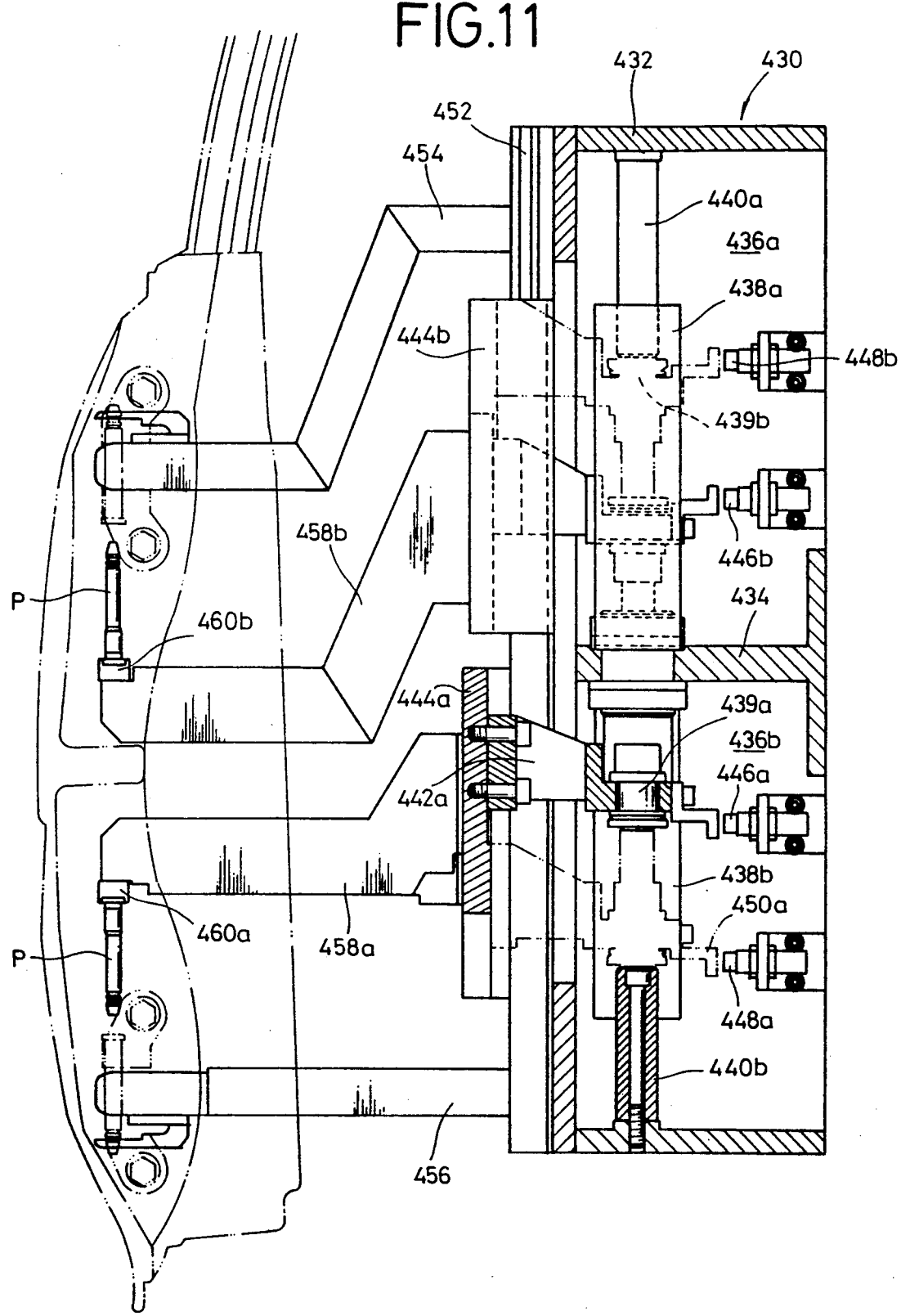
FIG. 11 is a front elevational view of a hinge pin pressing mechanism of the door installing robot.
Figure 12:
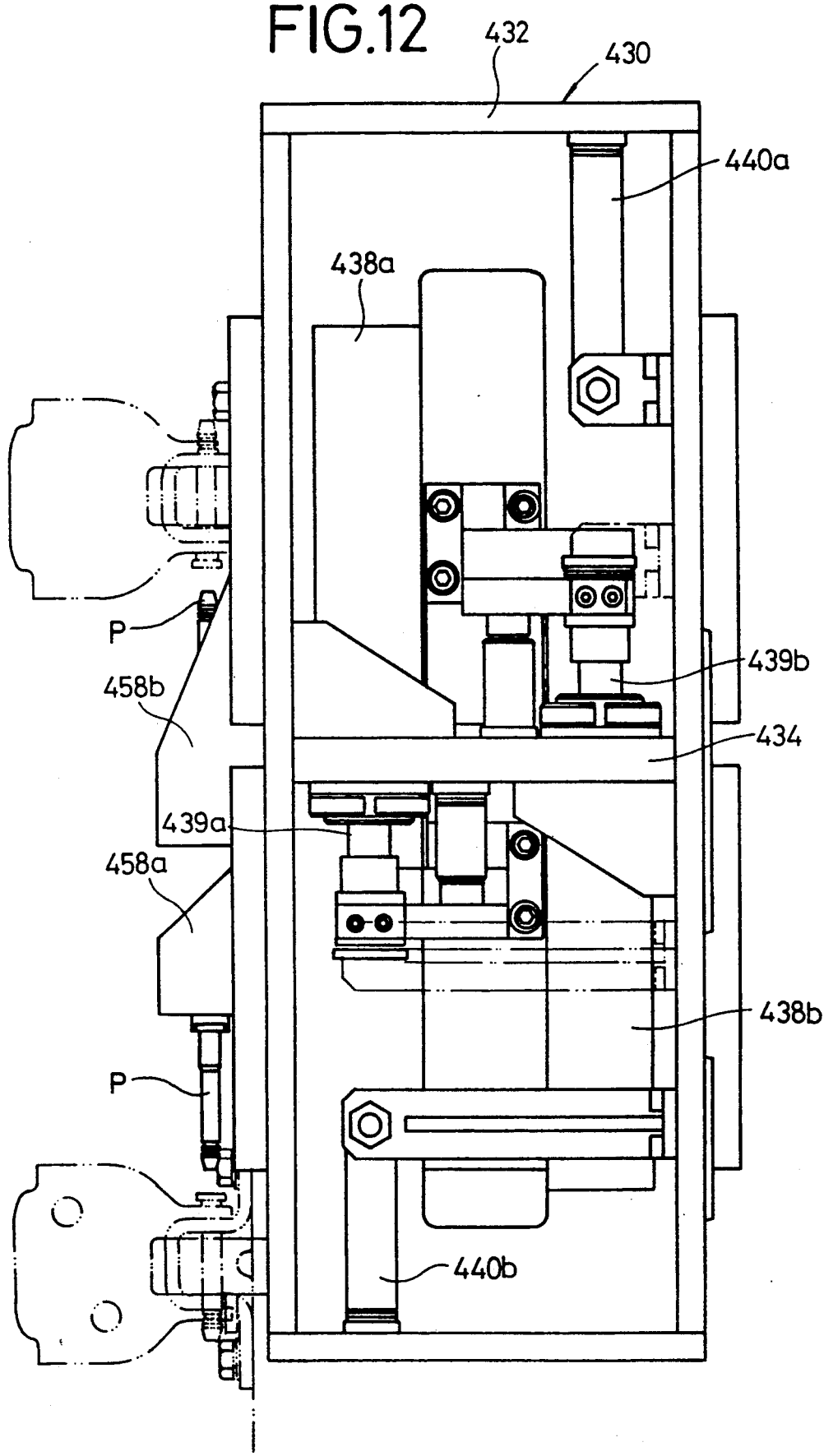
FIG. 12 is a side elevational view of the hinge pin pressing mechanism shown in FIG. 11.
Figure 13:
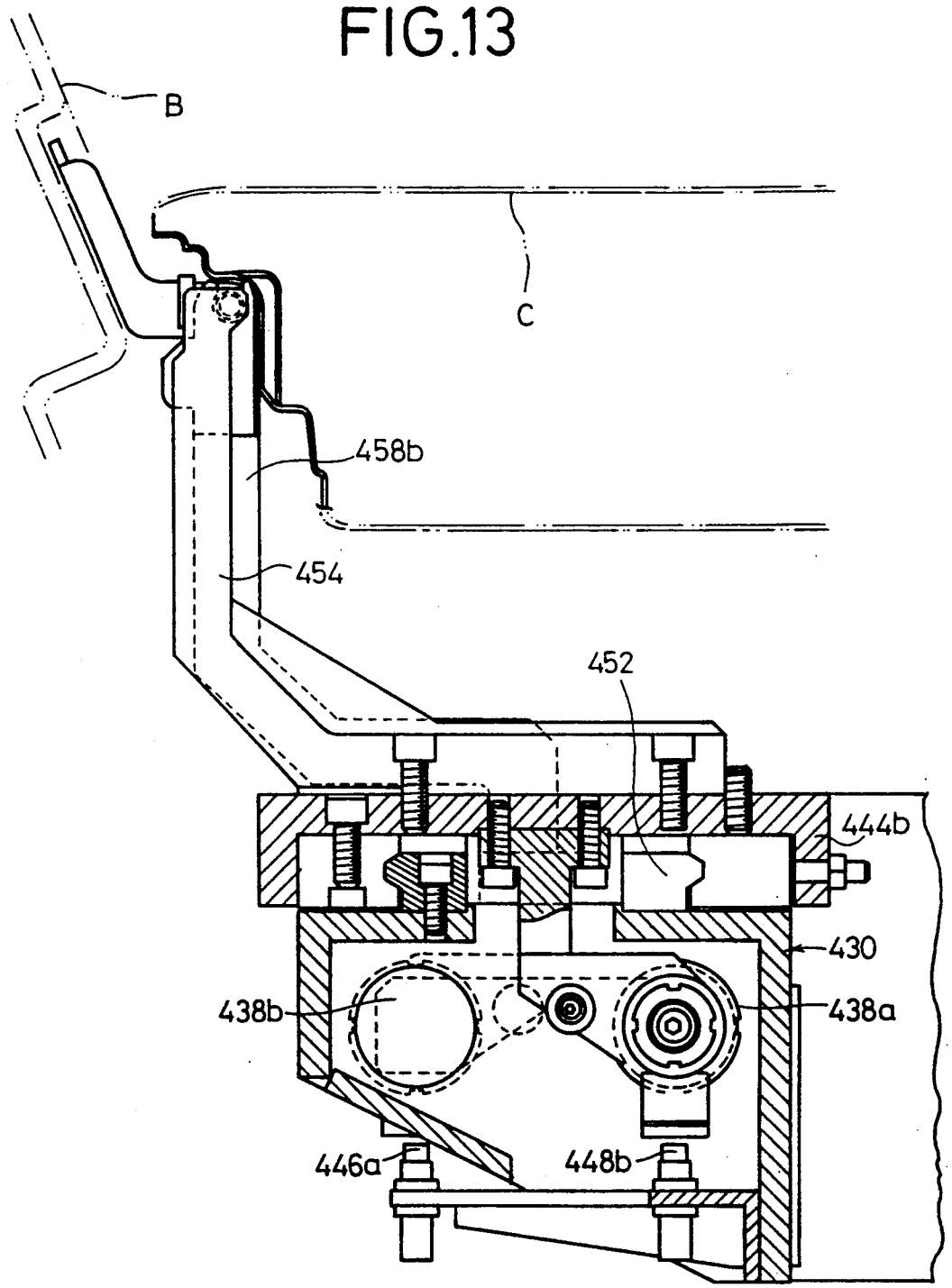
FIG. 13 is a vertical cross-sectional view of the hinge pin pressing mechanism.

As shown in FIGS. 11 through 13, a hinge pin pressing mechanism 430 is fixed to the distal end of the arm 402. As shown in FIG. 11, the hinge pin pressing mechanism 430 includes a casing 432 the interior of which is divided into first and second chambers 436a, 436b by a central partition 434. A cylinder 438a is disposed in the first chamber 436a and has a piston rod 439a extending through the partition 434 into the second chamber 436b. Similarly, a cylinder 438b is disposed in the second chamber 436b and has a piston rod 439b extending through the partition 434 into the first chamber 436a. A cylindrical stopper 440b is fixedly positioned in the second chamber 436b in axial alignment with the piston rod 439a, and a cylindrical stopper 440a is fixedly positioned in the first chamber 436a in axial alignment with the piston rod 439b. A bracket 442a is fixed to the distal end of the piston rod 439a and extends out of the casing 432 into engagement with a slider 444a. A pair of proximity switches 446a, 448a is disposed in the second chamber 436b, and a limit bracket 450a is secured to the bracket 442a for coaction with the limit switches 446a, 448b.

A rail 452 is disposed on one outer side and extends longitudinally along the casing 432, and bent arms 454, 456 are attached to respective ends of the rail 452. The arms 454, 456 serve load bearing arms and have distal end shaped, i.e., curved or tapered, for easy insertion into the hinge receivers 15a, 15b and 17a, 17b. A movable arm 458a is mounted on the slider 444a which is held in sliding engagement with the rail 452. The movable arm 458a supports on its distal end a permanent magnet 460a.

A bracket 442b is fixed to the distal end of the piston rod 439b and extends out of the casing 432 into engagement with a slider 444b. A pair of proximity switches 446b, 448b is disposed in the first chamber 436a, and a limit bracket 450b is secured to the bracket 442b for coaction with the limit switches 446b, 448b. A movable arm 458b mounted on the slider 444b which is held in sliding engagement with the rail 452. The movable arm 458b supports on its distal end a permanent magnet 460b.

Figure 14:
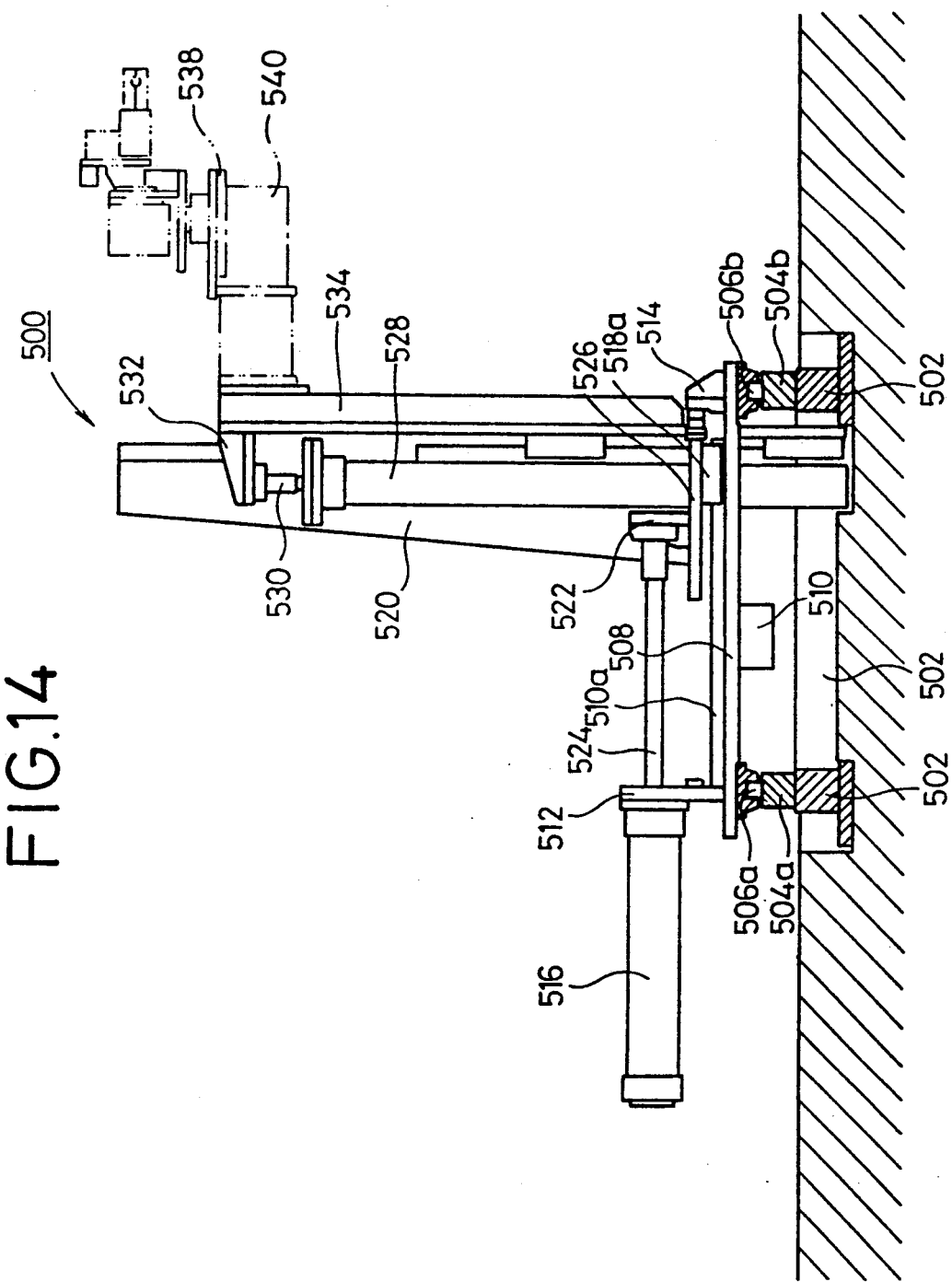
FIG. 14 is a front elevational view, partly in cross section, of a hinge pin setting mechanism.
Figure 15:
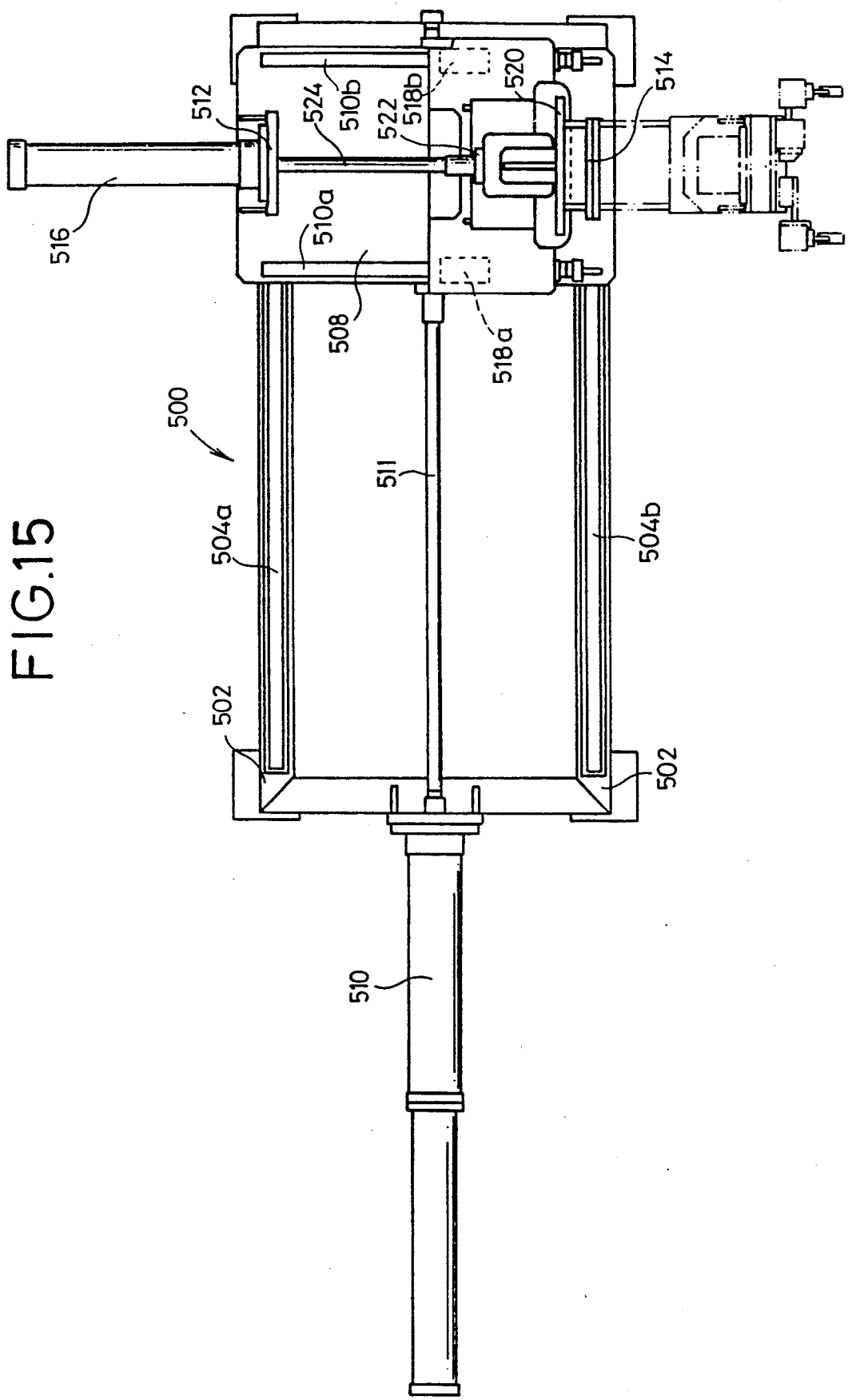
FIG. 15 is a plan view of the hinge pin setting mechanism shown in FIG. 14.

The hinge pin setting mechanism 500 will be described below with reference to FIGS. 14 and 15. As shown in FIGS. 14 and 15, the hinge pin setting mechanism 500 has its hand assembly movable transversely, longitudinally, and vertically with respect to vehicle bodies. More specifically, a pair of spaced rails 504a, 504b is disposed on a mount base 502, and a carriage 508 is movably placed on the rails 504a, 504b through rollers 506a, 506b. The carriage 508 engages a piston rod 511 of a cylinder 510 fixedly mounted on the mount base 502, so that the carriage 508 is displaceable in the longitudinal direction of vehicle bodies.

A pair of rails 510a, 510b is mounted on an upper surface of the carriage 508 perpendicularly to the rails 504a, 504b. The carriage 508 also supports thereon support walls 512, 514, with a long pin removal cylinder 516 attached to the support wall 512. Guides 518a, 518b are movably mounted respectively on the rails 510a, 510b, and a plate-like attachment member 526 is mounted on upper surfaces of the guides 518a, 518b. An upwardly extending holder 520 is mounted on the attachment member 526. Another support wall 522 is mounted on the attachment member 526 and engages a piston rod 524 of the cylinder 516.

Figure 16:
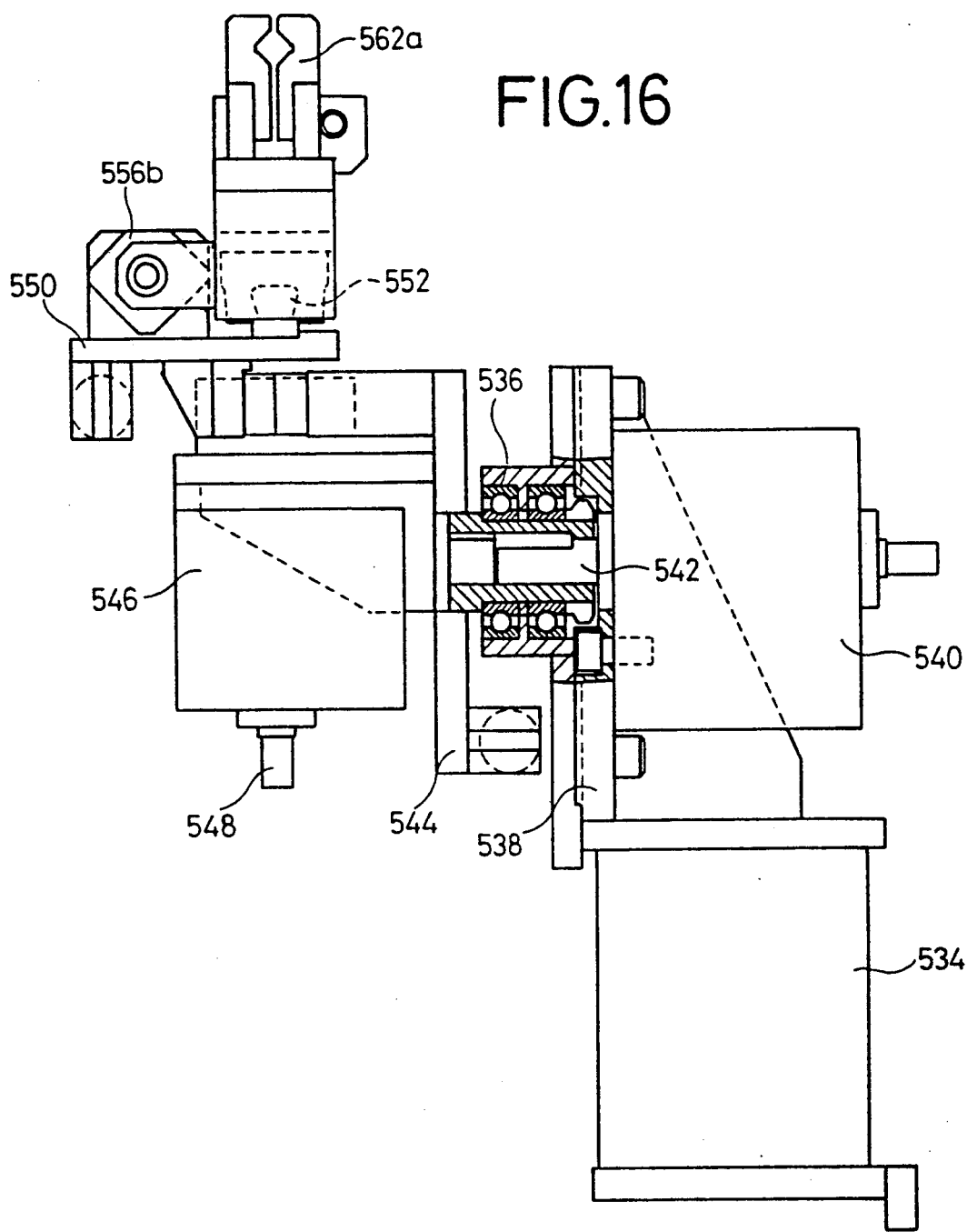
FIG. 16 is a front elevational view, partly in vertical cross section, of a clamp mechanism of the hinge pin setting mechanism.
Figure 17:
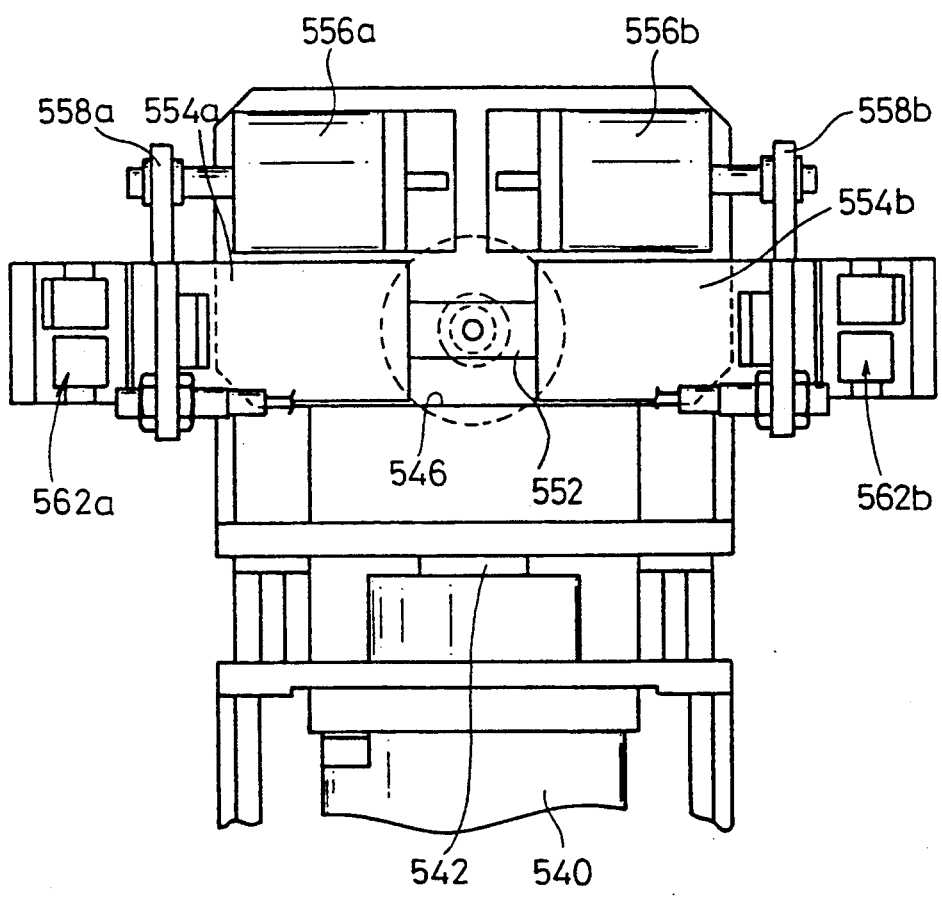
FIG. 17 is a side elevational view of the clamp mechanism shown in FIG. 16.
Figure 18:
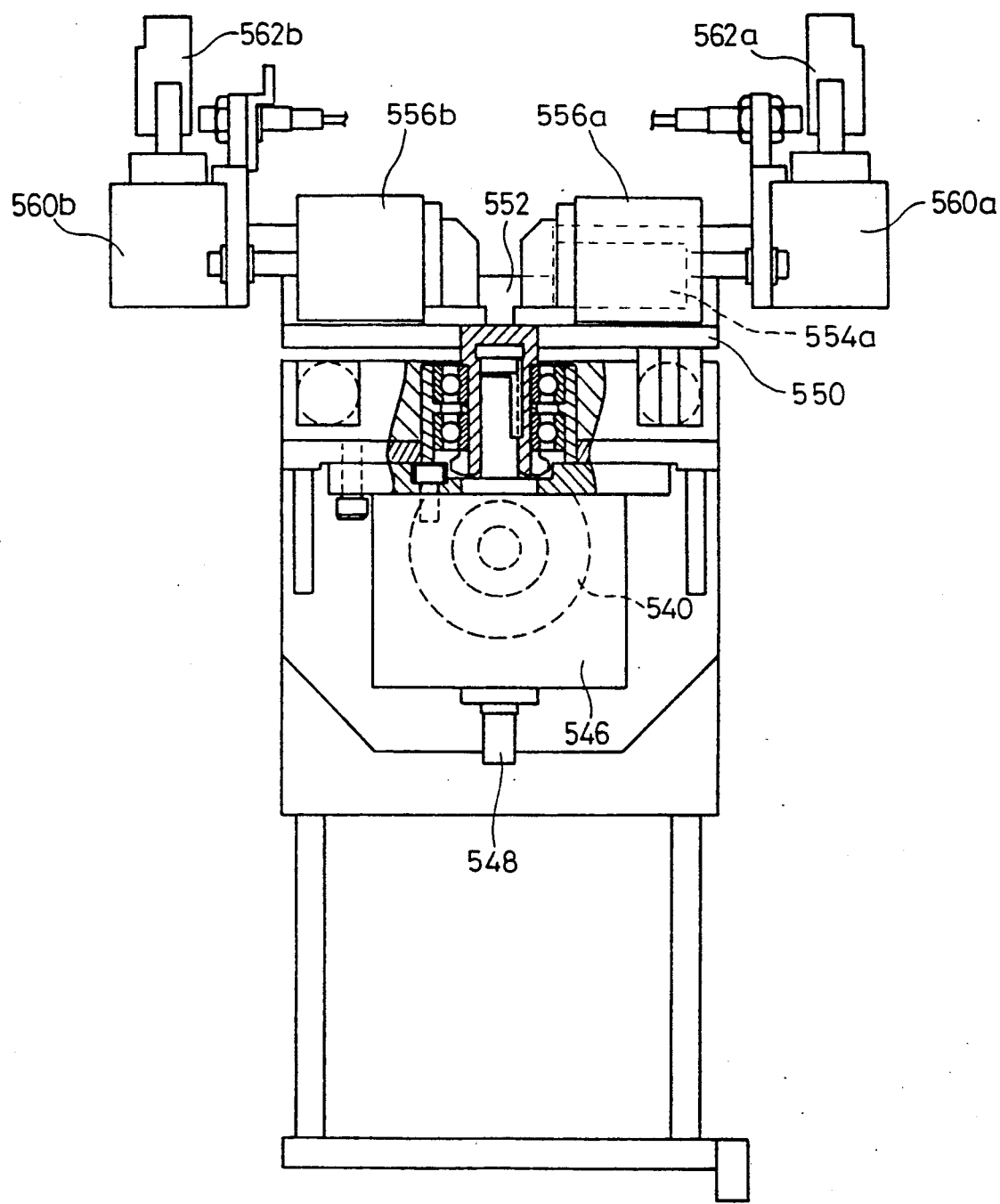
FIG. 18 is a plan view of the clamp mechanism shown in FIG. 16.

A cylinder 528 is mounted on the holder 520 by the attachment member 526, and has a piston rod 530 to which another holder 532 is coupled. To the holder 532, there is fixed a base 534 from which there projects a support plate 538 that supports a bearing 536 (FIG. 16). A rotary actuator 540 is fixedly mounted on the support pate 538. The rotary actuator 540 has a rotatable shaft 542 with a bracket 544 engaging the distal end thereof. Another rotary actuator 546 is fixed to the bracket 544 and has a rotatable shaft 548 to which another bracket 550 is secured. A guide rail 552 is disposed on one side of the bracket 550, and a pair of guides 554a, 554b is mounted on the guide rail 552. The guides 554a, 554b are displaceable on the guide rail 552 in unison with brackets 558a, 558b engaging cylinders 556a, 556b, respectively, which are fixedly mounted on the bracket 550. Cylinders 560a, 560b are mounted respectively on the brackets 558a, 558b, for opening and closing clamps 562a, 562b which serve to grip hinge pins P.

The assembling line or system for carrying out a method of feeding and installing hinge pins according to the present invention is basically constructed as described above. Now, operation and advantages of the system will be described below.

A motor vehicle B and doors C, which are assembled together, are coated with a paint. After the motor vehicle B and the doors C are coated, they are separated from each other. In FIG. 1, the doors C separated from the vehicle body B are suspended by the hanger means 18 and conveyed in the direction indicated by the arrow along the door conveying rails 14a, 14b. The vehicle body B is placed on the rail 12, and is also conveyed in the direction indicated by the arrow. At this time, the engagement pins 58a, 58b and 60a, 60b of the pallet 50 engage in water drain holes or the like in the vehicle body B, thus holding the vehicle body B securely on the pallet 50. The motor 28 on the carriage 16 is no energized. Rotative power from the motor 28 is reduced in speed by the worm speed reducer 32 and transmitted to the pinion 30. Since the pinion 30 is held in mesh with the rack 24, the carriage 16 moves along the rail body 20. Hinge pins P, which have been removed upon detachment of the doors C from the vehicle body B, are manually fitted in the respective U-shaped grooves 70a, 70b in the hinge pin engaging members 62a, 62b, with the heads of the hinge pins P fitted respectively in the grooves 74a, 74b. At this time, the heads of the hinge pins P are magnetically attracted to the permanent magnets 72a, 72b, respectively.

The vehicle body B, the doors C, and the hinge pins P which are separated from each other then reach the door installing station 100. The hinge pins P should preferably be held in the hinge pin engaging members 62a, 62b and 64a, 64b of the pallet 50 which is fixed to at least the preceding carriage 16, because the hinge pins P should already be readied for coupling the doors C to the vehicle body B when the doors C and the vehicle body B arrive at the door installing station 100.

The door C which is conveyed by the hanger means 18 is received by the door presetting mechanism 300, and stands by in a given position. The carriage 16, together with the pallet 50 which carries the vehicle body B, now reaches the door installing station 100. At this time, the door installing mechanism 200 is actuated to displace the door installing robot 400 transversely and longitudinally with respect to the vehicle body B toward the door presetting mechanism 300. The first cylinders 404a, 404b and the second cylinders 410a, 410b are actuated to hold the suction pads 414a, 414b against the glass sheet of the door C, and the third cylinders 418a, 418b are also actuated to turn the angularly movable members 424a, 424b about the shafts 422a, 422b to cause the door holders 426a, 426b to hold the door C in a predetermined posture. The door installing mechanism 200 is actuated again to displace the door installing robot 400 to a door installing position.

Before the above operation, the hinge pin setting mechanism 500 has been operated. More specifically, the cylinders 516, 510 are actuated to move the hinge pin setting mechanism 500 into a preferred position with respect to the hinge pins P which are held by the hinge pin engaging members 62a, 62b of the pallet 50. Then, the cylinders 556a, 556b are actuated to displace the brackets 558a, 558b away from each other along the guide rail 552. The cylinders 560a, 560b are actuated to close the clamps 562a, 562b to grip the hinge pins P. The cylinders 556a, 556b are also actuated to move the brackets 558a, 558b toward each other, and the cylinder 528 is actuated to elevate the holder 532 to feed the hinge pins P toward a predetermined position with respect to the door installing robot 400. The rotary actuators 540, 546 are then actuated to turn the clamps 562a, 562b through 90°. At this time, the door installing robot 400 actuates the cylinders 438a, 438b to displace the brackets 442a, 442b away from each other.

As described above, the movable arms 458a, 458b are coupled respectively to the brackets 442a, 442b, and the permanent magnets 460a, 460b are attached to the distal ends of the movable arms 458a, 458b. The hinge pins P held by the hinge pin setting mechanism 500 are moved with the movable arms 458a, 458b while the heads of the hinge pins P are being magnetically attracted by the permanent magnets 460a, 460b. Then, the hinge pin setting mechanism 500 is retracted to move the door installing robot 400 toward the door presetting mechanism 300, and the door installing robot 400 receives the door C. After the door installing robot 400 has positioned the door C, the door installing robot 400 moves toward the vehicle body B. When the hinge receivers 15a, 15b of the vehicle body B and the hinge receivers 17a, 17b of the door C are joined to each other in alignment, the arms 454, 456 of the hinge pin pressing mechanism 430 are inserted respectively in the hinge receivers 17a, 17b of the door C, and the cylinders 438a, 438b of the hinge pin setting mechanism 500 are actuated to displace the movable arms 458a, 458b away from each other to bring the hinge pins P carried thereby into the aligned hinge receivers 15a, 17a and 15b, 17b against the arms 454, 456. At this time, the arms 454, 456 serve as load bearing arms to bear loads applied when the hinge pins P are inserted into the hinge receivers 15a, 17a and 15b, 17b. The cylinders 438a, 438b are inactivated when the limit brackets 450a, 450b approach the respective proximity switches 448a, 448b, so that the distance which is traversed by the movable arms 458a, 458b is controlled by these limit switches. When the hinge pins P are securely positioned in the hinge receivers 15a, 15b and 17a, 17b thereby coupling the door C to the vehicle body B, the cylinders 438a, 438b are actuated again to displace the movable arms 458a, 458b toward each other until the limit brackets 450a, 450b reach the respective limit switches 446a, 446b. Thereafter, the hinge pin setting mechanism 500 returns to its original position. The door installing mechanism 200, the door presetting mechanism 300, and the door installing robot 400 also return to their original positions. The other door C is also installed on the other side of the vehicle body B at the same time. Another set of doors C, typically rear doors, are then installed on the vehicle body B. Finally, the door closing mechanisms 600 are operated to close the doors C.

Figure 19:
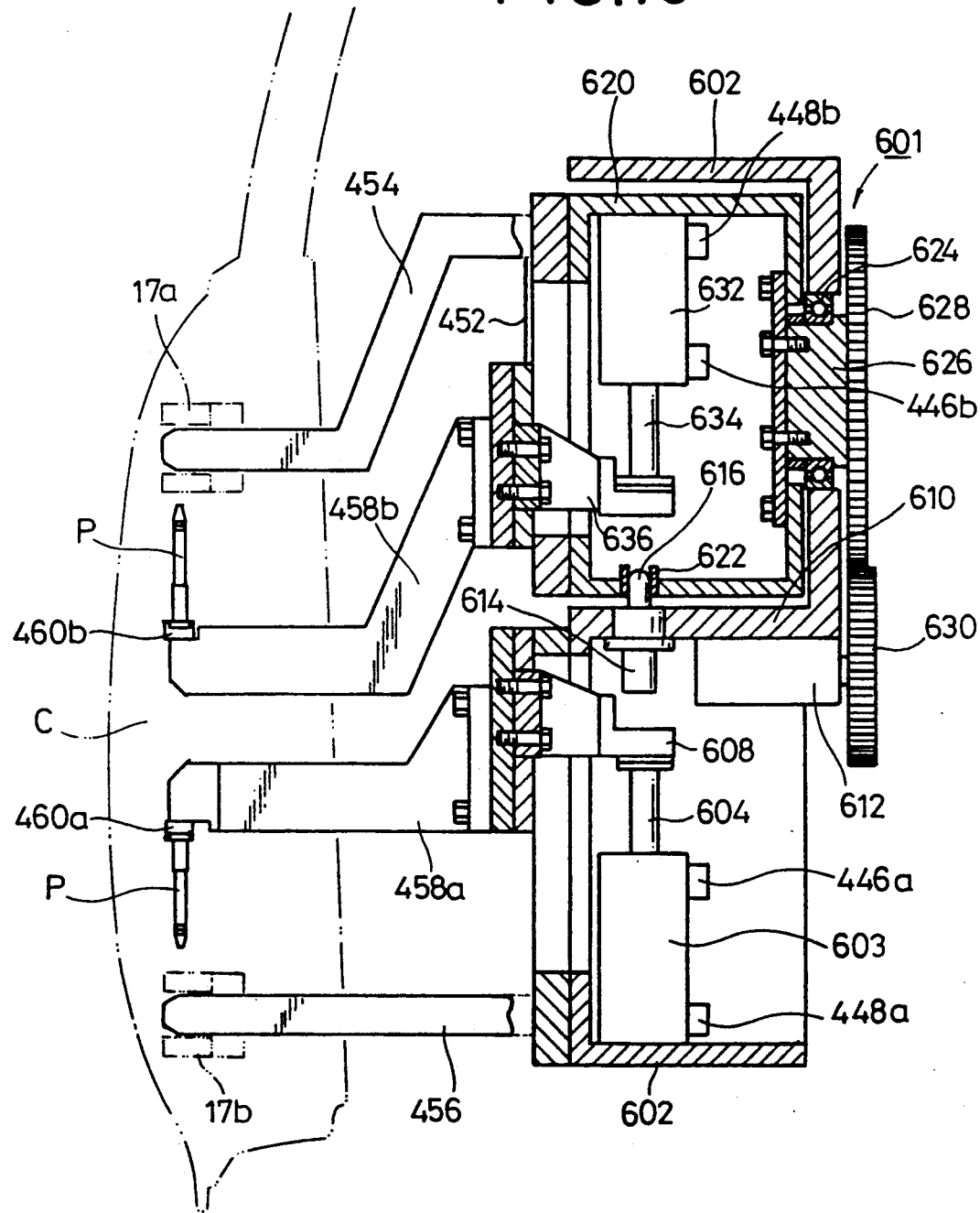
FIG. 19 is a vertical cross-sectional view of a hinge pin pressing mechanism according to another embodiment of the present invention.
Figure 20:
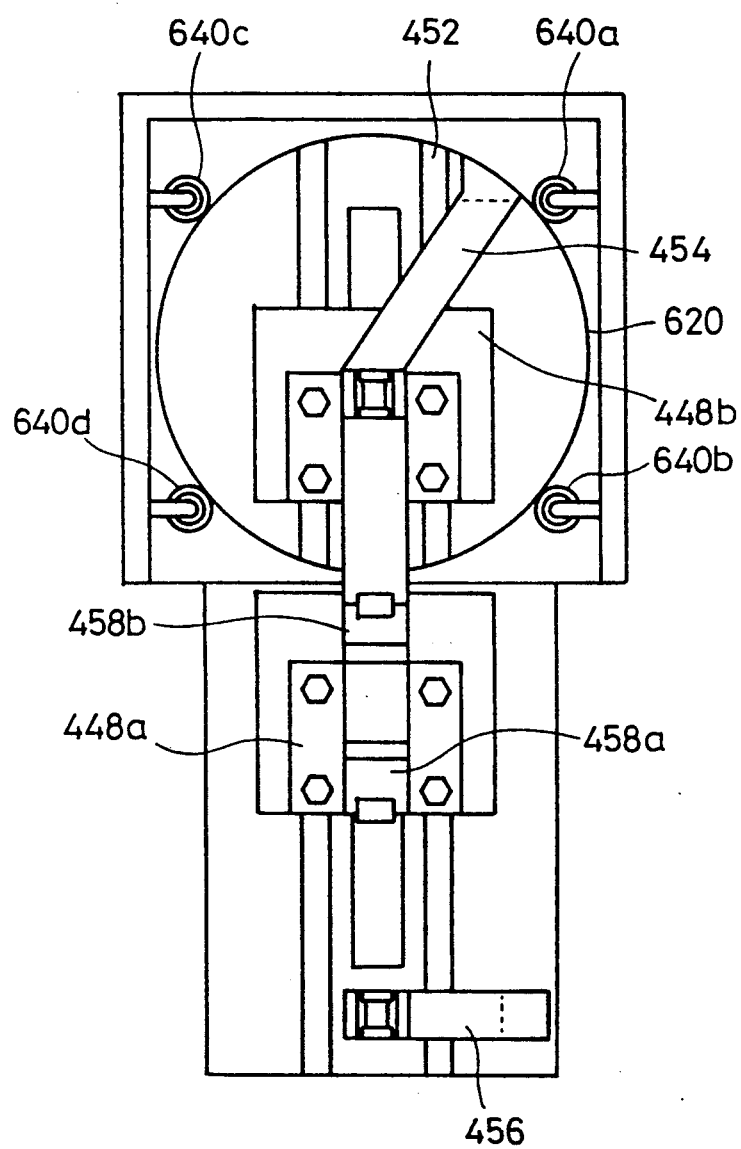
FIG. 20 is a front elevational view of the hinge pin pressing mechanism shown in FIG. 19.

FIGS. 19 and 20 show a hinge pin pressing mechanism according to another embodiment of the present invention. The hinge pin pressing mechanism, generally denoted at 601, is mounted on the distal end of each of the door installing robots 400.

The hinge pin pressing mechanism 601 includes a frame 602 fixedly mounted on the distal end of the robot arm 402 (see FIG. 9). A first pressing arm lifting/lowering cylinder 603 is fixedly mounted on the bottom of the frame 602, and has a piston rod 606 to which a bracket 608 is connected. The bracket 608 supports a movable arm 458a fastened thereto. The frame 602 has a partition 610 which supports a motor 612 for rotating a rotatable frame 620. A lock cylinder 614 for locking the rotatable frame 620 in a certain angular position is also mounted on the partition 610 near the motor 612. The lock cylinder 612 has a piston rod 616 whose distal end is positioned near a bushing 622 mounted in an outer wall of the rotatable frame 620.

The rotatable frame 620 is rotatably mounted in an upper portion of the frame 620 by a bearing 624. More specifically, the rotatable frame 620 has a shaft 626 fitted in the bearing 624 and secured to a gear 628 which is held in mesh with a drive gear 630 that is coupled to the rotatable shaft of the motor 612. A second pressing arm lifting/lowering cylinder 632 is disposed in the rotatable frame 620 and has a piston rod 634 to which there is coupled a bracket 636 supporting a movable arm 458b. The rotatable frame 620 is supported at its outer circumferential surface by guide rollers 640a through 640d which are supported in the upper portion of the frame 602, so that the rotatable frame 620 can smoothly rotate in the frame 602. The movable arms 458a, 458b supports permanent magnets 460a, 460b respectively on their distal ends.

In operation, the hinge pin pressing mechanism 601 is caused by the robot installing robot 400 to pick up hinge pins according to a pattern which has been taught.

In the previous embodiment, the hinge pins P are held and conveyed by the hinge pin engaging members 62a, 62b and 64a, 64b. According to the embodiment shown in FIGS. 19 and 20, the hinge pins P remain inserted in the hinge receivers 17a, 17b of the door C.

Then, the motor 612 is energized to cause the gears 630, 628 to rotate the rotatable frame 620 with respect to the frame 602 until the movable arm 458b is turned into an upper position which is 180° opposite to the position shown in FIG. 19.

The first pressing arm lifting/lowering cylinder 604 and the second pressing arm lifting/lowering cylinder 632 are then actuated to move the movable arms 458a, 458b until the hinge pins P are magnetically attracted and lifted from the hinge receivers 17a, 17b of the door C by the magnets 460a, 460b. When the hinge receivers 17a, 17b of the door C are aligned with the respective hinge receivers 15a, 15b of the vehicle body B, the motor 612 is energized again to rotate the movable arm 458b into the position shown in FIG. 19. Then, the lock cylinder 614 is actuated to insert the piston rod 616 into the bushing 622, thereby locking the rotatable frame 620 against rotation.

Thereafter, the hinge pins P are inserted into the aligned hinge receivers 15a, 17a and 15b, 17b, so that the door C is pivotally coupled to the vehicle body B.

According to the present invention, it is possible to use a hinge pin, which matches the type of a motor vehicle to be assembled and which coated in the same color as that of the vehicle body and doors, in the installation and separation of the doors on and from the vehicle body. Since hinge pins which will couple the doors to the vehicle body are persistently used as couplings from the stage in which the doors are provisionally installed on the vehicle body to the state in which the doors are finally installed on the vehicle body, the hinge pins can easily be kept and prevented from being lost as they move in relation to the vehicle body. The possibility that the hinge pins may be mounted on vehicle bodies which are coated in different colors is small, and the hinge pins will not obstruct the installation of other parts such as fittings into the vehicle body. Inasmuch as hinge pins are stocked in one place, the worker finds the assembling process easy and can easily keep the hinge pins.

Moreover, when inserting a hinge pin into hinge receivers with a pair of arms, one of the arms is used as a load bearing arm, which is shaped at its distal end for easy insertion into the hinge receivers. The hinge pin is inserted into the hinge receivers against the load bearing arm by an actuator such as a cylinder, so that the hinge pin can reliably be inserted for secure engagement between the hinge receivers. The hinge pins can be inserted easily in an upright position by the permanent magnets which magnetically attract the hinge pins.

Although certain preferred embodiments have been shown and described, it should be understood that many changes and modifications may be made therein without departing from the scope of the appended claims.

What is claimed is:

1. An apparatus for feeding a hinge pin which has been temporarily removed from a vehicle body and for reinstalling said hinge pin for coupling a first hinge member mounted on the vehicle body and a second hinge member mounted on a door to be installed on the vehicle body, said apparatus comprising:

a vehicle body conveying line for conveying a vehicle body, said vehicle body conveying line including a vehicle body conveying means comprising a pallet for placing the vehicle body thereupon and a carriage for support said pallet;

a door conveying means for conveying a door;

a door installing mechanism for installing the door on the vehicle body;

hinge pin feeding means for feeding a hinge pin which has been temporarily removed from said vehicle body, said hinge pin feeding means comprising a hinge pin engaging member mounted on said vehicle body conveying means for engaging said hinge pin, said hinge pin engaging member having a first opening which opens outwardly for receiving a shank of the hinge pin, and a second opening held in communication with the said first opening for receiving a head of the hinge pin, said hinge pin engaging member being displaceable in unison with the vehicle body conveyed by said vehicle body conveying line;

hinge pin reinstalling means for reinstalling said hinge pin on the vehicle body and the door, said hinge pin reinstalling means comprising a hinge pin pressing mechanism for pressing said hinge pin into the first and second hinge members, said hinge pin pressing mechanism including a load bearing arm for engaging the first hinge member, a hinge pin pressing arm movable through the second hinge member toward the first hinge member, and an actuator for moving said hinge pin pressing arm, said hinge pin pressing arm having a permanent magnet for holding the hinge pin; and hinge pin setting means disposed along side of said vehicle body conveying line and movable between said vehicle body conveying means and said door installing mechanism, said hinge pin setting means comprising a vertically movable support plate, a rotary actuator unit disposed on said vertically movable support plate, a bracket rotatable by said rotary actuator unit, at least one clamp displaceable along a rail on said bracket, and an actuator for opening and closing said clamp to release and grip the hinge pin.

2. An apparatus according to claim 1, wherein said hinge pin engaging member includes a permanent magnet facing into said opening and a magnetic shield sleeve by which said permanent magnet is partly magnetically shielded.

3. An apparatus according to claim 1, wherein said hinge pin engaging member is constructed to hold two hinge pins at a time.

4. An apparatus according to claim 1, wherein said load bearing arm has a curved or tapered distal end.

5. An apparatus according to claim 1, wherein said rotary actuator unit comprises first and second rotary actuators, said first rotary actuator having a first rotatable shaft, said bracket being fixed to said first rotatable shaft, said second rotary actuator having a second rotatable shaft having another bracket fixed thereto, said first rotary actuator being mounted on the other bracket, wherein said first and second rotary shafts are disposed perpendicularly to each other.

* * * * *